(12) United States Patent
Munro et al.

(10) Patent No.: US 7,769,173 B2
(45) Date of Patent: Aug. 3, 2010

(54) METHODS AND SYSTEMS FOR EXECUTING BIT-COMMITMENT PROTOCOLS THAT ARE BASED ON ENTANGLED QUANTUM STATES AND A THIRD PARTY

(75) Inventors: William John Munro, Bristol (GB); Timothy Paul Spiller, Bristol (GB); Raymond Beausoleil, Redmond, WA (US); Keith Harrison, Monmouthshire (GB); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 11/590,493

(22) Filed: Oct. 30, 2006

(65) Prior Publication Data
US 2008/0107273 A1    May 8, 2008

(51) Int. Cl.
*H04L 9/08*     (2006.01)
*H04K 1/00*     (2006.01)
*H01L 29/12*    (2006.01)
*H04B 10/00*    (2006.01)
*H04B 10/12*    (2006.01)

(52) U.S. Cl. .................. 380/255; 380/256; 380/278; 398/115; 398/132; 398/140; 708/9

(58) Field of Classification Search .......... 380/255, 380/256, 277, 278; 250/251; 398/9, 39, 398/115, 132, 140; 385/1
See application file for complete search history.

(56) References Cited
U.S. PATENT DOCUMENTS

| | | | | |
|---|---|---|---|---|
| 7,459,673 B2* | 12/2008 | Katori | ........................ | 250/251 |
| 2003/0071258 A1* | 4/2003 | Zagoskin et al. | .............. | 257/31 |
| 2005/0249352 A1* | 11/2005 | Choi et al. | .................. | 380/286 |
| 2006/0225165 A1* | 10/2006 | Maassen van den Brink et al. ................................................... 977/933 | | |
| 2007/0192598 A1* | 8/2007 | Troxel et al. | ................ | 713/168 |

OTHER PUBLICATIONS

Chen et al (Quantum secure circuit evaluation, © Science in China Press, 2004, hereinafter "Chen").*

* cited by examiner

*Primary Examiner*—Edan Orgad
*Assistant Examiner*—Jahangir Kabir

(57) ABSTRACT

Various method and system embodiments of the present invention are directed to executing bit-commitment protocols. In one embodiment of the present invention, a method for executing a bit-commitment protocol for transmitting a bit from a first party to a second party comprises preparing a three qubits are entangled in a W-state, and storing a first of the three qubits in a first storage device controlled by the first party, a second of the three qubits is stored in a second storage device controlled by the second party, and a third of the three qubits is stored in a third storage device controlled by a third party. The bit is revealed to the second party by transmitting the first and third qubits to the second party and measuring the states of the three qubits to which of the entangled W-states the three qubits are in.

33 Claims, 15 Drawing Sheets

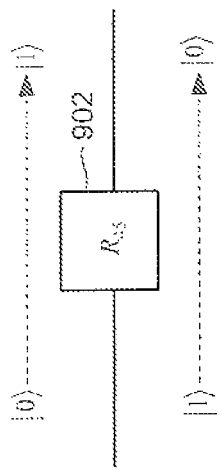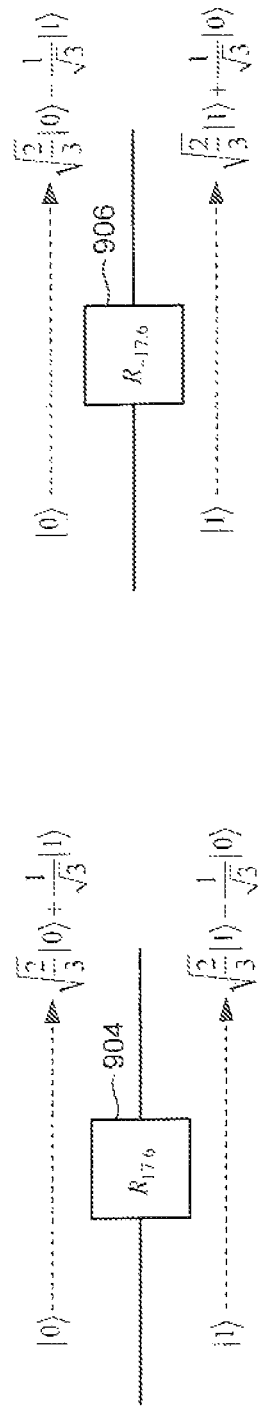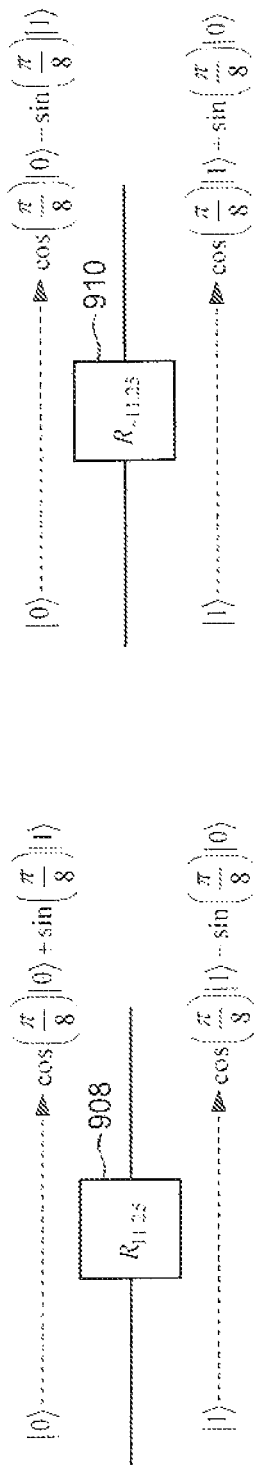
Figure 9A
Figure 9B
Figure 9C

US 7,769,173 B2

METHODS AND SYSTEMS FOR EXECUTING BIT-COMMITMENT PROTOCOLS THAT ARE BASED ON ENTANGLED QUANTUM STATES AND A THIRD PARTY

TECHNICAL FIELD

The present invention relates to methods and systems for executing bit-commitment protocols, and, in particular, to methods and systems for executing bit-commitment protocols that employ entangled quantum states and a third party.

BACKGROUND

Cryptography is the science of protecting information from eavesdropping and tampering and is often carried out by encrypting the information into an unreadable format. The encrypted information can then be stored or sent to a receiving party who can only read the information by decrypting the information into a readable format. Bit-commitment protocols are kinds of cryptographic procedures that can be followed by two or more mistrusting parties to exchange information. A number of different bit-commitment protocols that are based on encryption algorithms have been developed over the years.

Bit-commitment protocols are typically described with reference to two mistrusting parties, called "Alice" and "Bob," who agree to exchange information in the form of bits. For example, Alice and Bob can use the state pair a bit (a two-state system), represented by "0" and "1," to represent closed-question answers, such as "Yes" and "No," or "True" and "False." Alice and Bob can also use a bit string to encode information and a bit-commitment protocol to verify that each bit in the bit string has not been tampered with. Suppose, for example, that Alice is a stock broker who wants to sell Bob her stock tips. Alice wants to show Bob that she has a proven method for selecting stocks by sending him a list of stock tips before the stocks change. However, Alice does not want Bob to peek at the list and profit from her stock tips without first purchasing the tips. On the other hand, Bob wants to be sure that before Alice gives him the list of stock tips, Alice cannot revise her original list of stock tips after the stocks have changed. Both Alice and Bob may agree to use a bit-commitment protocol that employs an encryption algorithm to encrypt the stock tips and uses a private numeric key to decrypt the encrypted stock tips.

FIGS. 1A-1B illustrate two examples of bit-commitment protocols. Bit-commitment protocols are typically comprised of a commitment phase and a reveal phase. For example, in both FIGS. 1A-1B, the commitment phases correspond to solid-line directional arrows 102 and 103, and the reveal phases correspond to dashed-line directional arrows 104-106. In FIG. 1A, Alice completes the commitment phase by sending Bob the encrypted stock tips. At a later time, when the stocks have changed and Alice is ready to reveal the stock tips to Bob, Alice completes the reveal phase by sending the numeric key to Bob so that Bob can decrypt the encrypted stock tips and check whether the stock tips were indeed correct. In order for the bit-commitment protocol to operate properly, Alice cannot change her committed bit by choosing a different numeric key to send to Bob at the reveal phase. For an added level of security, Alice and Bob may agree to employ the services of a third party called "Trent." In FIG. 1B, Alice again encrypts the stock tips using the encryption algorithm, but, in this protocol, Alice completes the commitment phase by sending the encrypted stock tips to Trent. Trent holds the encrypted stock tips until Alice is ready to reveal the stock tips to Bob. Alice completes the reveal phase by instructing Trent to send the encrypted stock tips to Bob and she sends the numeric key to Bob.

Bit-commitment protocols that rely on encryption algorithms and third parties, however, may not be reliable. The encryption algorithms often rely on unproven mathematical assumptions, such as one-way functions and pseudorandom number generators, and advancements in mathematics, computer science, and quantum computing may make it possible to decrypt encrypted information. For example, in the first example shown in FIG. 1A, Bob may possess an algorithm that allows him to decrypt the encrypted stock tips without the numeric key. In addition, a third party entrusted with holding encrypted information may be persuaded to conspire with one of the mistrusting parties. For example, in the second example shown in FIG. 1B, Trent may conspire with Alice so that Alice can encrypt tips on stocks that increased in value, or Trent may conspire with Bob by providing Bob with the encrypted stock tips so that Bob can decrypt the encrypted stock tips and purchase the stocks before the stocks change. Physicists, cryptologists, and computer scientists have recognized a need for methods and systems that can be used to execute bit-commitment protocols that are not based on encryption algorithms and the information held by the third party is not sufficient alone to determine the bit with certainty.

SUMMARY

Various method and system embodiments of the present invention are directed to executing bit-commitment protocols. In one embodiment of the present invention, a method for executing a bit-commitment protocol for transmitting a bit from a first party to a second party comprises preparing a preparing three qubits in one of two entangled W-states. A first W-state represents one bit value and a second W-state represents a second bit value. Two of the three qubits are in a first qubit-basis state and one of the three qubits is in a second qubit-basis state. A first qubit of the three qubits is stored in a first storage device controlled by the first party, a second qubit of the three qubits is stored in a second storage device controlled by the second party, and a third qubit of the three qubits is stored in a third storage device controlled by a third party. The bit is revealed to the second party by transmitting the first qubit and the third qubit to the second party, and measuring the states to determine which of the two entangled W-states the three qubits are in.

BRIEF DESCRIPTION OF THE DRAWINGS

FIGS. 9A-9C show circuit diagram representations corresponding to the half-wave plates shown in FIG. 8A-8F.

DETAILED DESCRIPTION OF THE INVENTION

Figure 1:
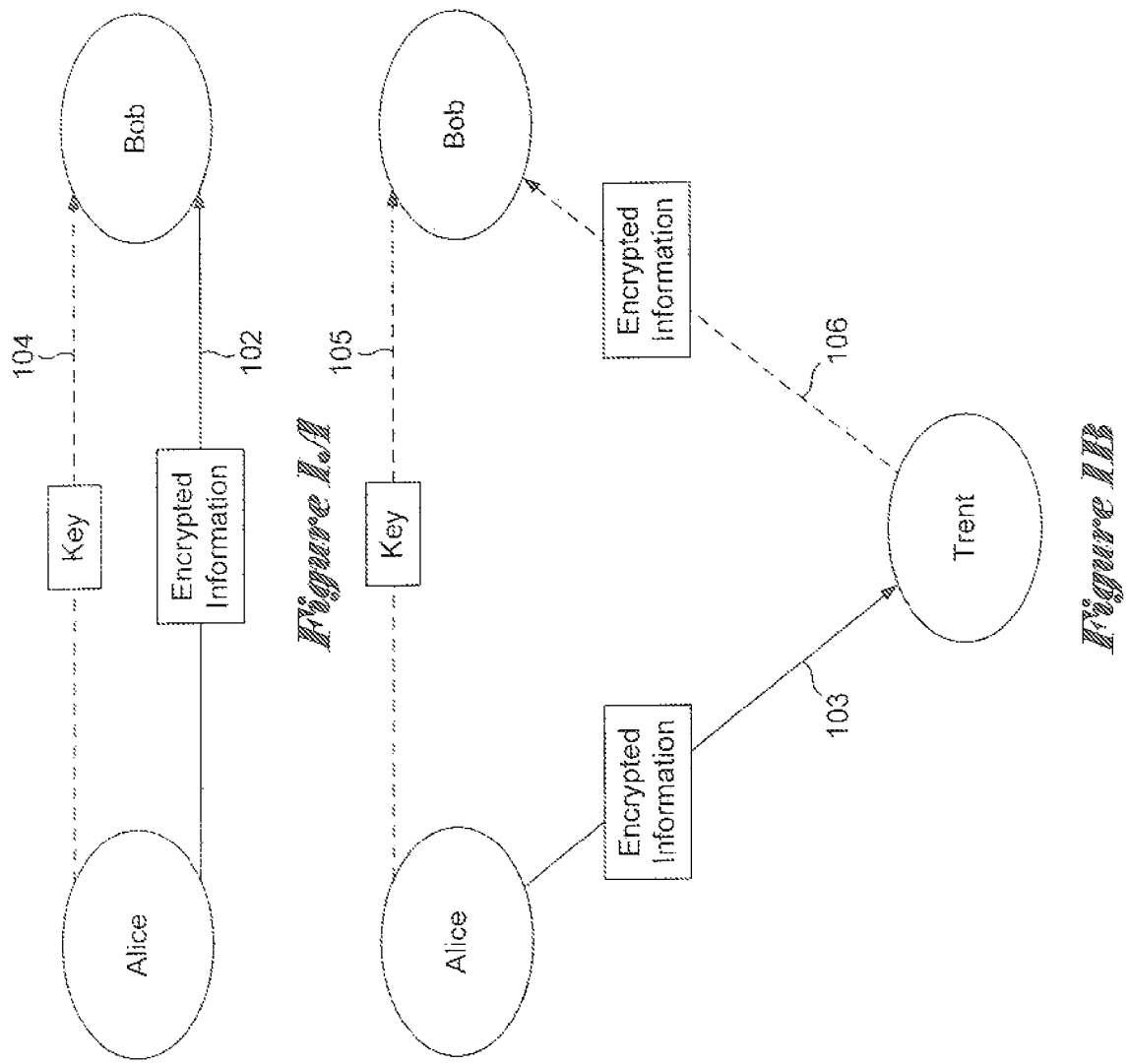
FIGS. 1A-1B illustrate two examples of bit-commitment protocols.

Various embodiments of the present invention are directed to methods and systems for executing bit-commitment protocols that employ entangled quantum states and a third party. Embodiments of the present invention are mathematical in nature and, for this reason, are described below with reference to numerous equations and numerous graphical illustrations. Although mathematical expressions, alone, may be sufficient to fully describe and characterize embodiments of the present invention to those skilled in the art of quantum optics and quantum information, the more graphical, problem oriented examples, and control-flow-diagram approaches included in the following discussion are intended to illustrate various embodiments of the present invention in a variety of different ways so that the present invention may be accessible to readers with various backgrounds. Also, in order to assist the reader in understanding descriptions of various embodiments of the present invention, overview subsections of related topics in physics are provided. In a first subsection, an overview of quantum mechanics is provided. An overview of electromagnetic radiation and quantum optics is provided in a second subsection. An overview of entanglement is provided in a third subsection. An overview of polarization states, half-wave plates, and the controlled-not gate are provided in a fourth subsection. Finally, various system and method embodiments of the present invention are described in a fourth subsection.

An Overview of Quantum Mechanics

Embodiments of the present invention employ concepts in quantum mechanics. The textbook *Quantum Mechanics, Vols. I and II*, by Claude Cohen-Tannoudji, Bernard Diu and Frank Laloe, Hermann, Paris, France, 1977, is one of many excellent references for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior, atomic and subatomic levels, of systems comprising photons, electrons, atoms, and molecules. Quantum systems exist in discrete states that are characterized by discrete measurable quantities. A state of a quantum system is represented by a ket and is denoted $|\Psi\rangle$ where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546\times10^{-34}$ Js. The spin state that corresponds to the spin-angular momentum $\hbar/2$ is referred to as "spin up" and is denoted $|\uparrow\rangle$ and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|½\rangle$ and $|-½\rangle$, respectively. Also, a single label can be used to represent different states in entirely different quantum systems. For example, the ket "$|1\rangle$" can represent a first quantized vibrational level of a diatomic molecule and can also be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle)=\hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle=\psi_i|\psi_i\rangle$$

where
i is an integer, and
$\psi_i$ is a real value, called an "eigenvalue," that corresponds to a discrete measurable quantity that is observed when the quantum system is in the eigenstate $|\psi_i\rangle$.

For example, a measurement employed to determine the spin angular momentum of an electron parallel to the z-axis is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and}$$

$$\hat{S}_z|\downarrow\rangle = -\frac{\hbar}{2}|\downarrow\rangle$$

The eigenstates of an operator are complex vectors that span a complex vector space called a "state space." The eigenstates constitute a basis of the vector space if every state belonging to the state space has a unique linear superposition on the basis. For example, a state $|\Psi\rangle$ in a state space spanned by the N eigenstates $\{|\psi_i\rangle\}$ of an operator $\hat{\Psi}$ the can be written as a linear superposition of the eigenstates as follows:

$$|\Psi\rangle = \sum_{i=1}^{N} c_i|\psi_i\rangle$$

where $c_i$ is a complex valued coefficient called the "amplitude." The state space associated with an operator is also called a "Hilbert space." A Hilbert space includes a mathematical operation called the "inner product." The inner product of two states $|\Psi\rangle$ and $|\Xi\rangle$ is represented by:

$$\langle\Xi|\Psi\rangle$$

where $\langle$ is called a "bra," and represents the complex conjugate and transpose of the state $|\Xi\rangle$. The inner product has the following property:

$$\langle\Xi|\Psi\rangle=\langle\Psi|\Xi\rangle^*$$

where "*" represents the complex conjugate. The basis eigenstates of a Hilbert space are orthonormal, or in mathematical notation:

$$\langle\psi_i|\psi_j\rangle=\delta_{ij}$$

where $\delta_{ij}$ is 1 when i equals j, and 0 otherwise. For example, the inner product of the eigenstates of a single electron Hilbert space are:

$$\langle\uparrow|\uparrow\rangle=\langle\downarrow|\downarrow\rangle=1, \text{ and}$$

$$\langle\uparrow|\downarrow\rangle=\langle\downarrow|\uparrow\rangle=0$$

The orthonomality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^N c_i\langle\psi_j|\psi_i\rangle = \sum_{i=1}^N c_i\delta_{ij} = c_j$$

Substituting for the coefficients in the linear superposition gives:

$$|\Psi\rangle = \sum_{i=1}^N |\psi_i\rangle\langle\psi_i|\Psi\rangle$$

Because $|\Psi\rangle$ is an arbitrary ket in the Hilbert space, $$\sum_{i=1}^N |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

The eigenstates of an operator can be represented by orthogonal normalized column vectors and the operator can be represented by a square matrix. For example, the eigenstates of a single electron Hilbert space associated with the operator $\hat{S}_z$ are represented by the column vectors:

$$|\uparrow\rangle \square \begin{bmatrix} 1 \\ 0 \end{bmatrix}, \text{ and } |\downarrow\rangle \square \begin{bmatrix} 0 \\ 1 \end{bmatrix}$$

where the symbol "$\square$" stands for "is represented by." The transposed complex conjugates of the eigenstates are represented by the row vectors:

$$\langle\uparrow|\square[1 0], \text{ and } \langle\downarrow|\square[0 1]$$

Using the completeness relation, an operator $\hat{O}$ on the basis $\{|\psi_i\rangle\}$ can also be represented by:

$$\hat{O} = \sum_{i=1}^N \sum_{j=1}^N |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O}\square \begin{bmatrix} \langle\psi_1|\hat{O}|\psi_1\rangle & \langle\psi_1|\hat{O}|\psi_2\rangle & \cdots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \cdots & & \langle\psi_N|\hat{O}|\psi_N\rangle \end{bmatrix}$$

The matrix representation of the operator $\hat{O}$ equal to $\hat{\Psi}$ has zero off diagonal elements, and the diagonal elements are the eigenvalues $\{\psi_i\}$. For example, the electron spin z-axis operator can be given by:

$$\hat{S}_z = \frac{\hbar}{2}\hat{\sigma}_z$$

where $$\hat{\sigma}_z = |\uparrow\rangle\langle\uparrow| - |\downarrow\rangle\langle\downarrow|.$$

The matrix representation of the electron spin operator $\hat{S}_z$ is given by:

$$\hat{S}_z \square \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix} = \frac{\hbar}{2}\begin{bmatrix} 1 & 0 \\ 0 & -1 \end{bmatrix}$$

An operator $\hat{O}$ is called a "Hermitian operator" if $$\hat{O}=\hat{O}^\dagger$$

The corresponding matrix elements satisfy the condition:

$$\langle\psi_i|\hat{O}|\psi_j\rangle=\langle\psi_j|\hat{O}^\dagger|\psi_i\rangle$$

Prior to a measurement corresponding to an operator $\hat{\Psi}$, a quantum system can be thought of an simultaneously existing in all of the eigenstates $\{|\psi_i\rangle\}$ of a the operator $\hat{\Psi}$, which is represented by the (pure state) linear superposition of states:

$$|\Psi\rangle = \sum_{i=1}^N c_i|\psi_i\rangle = \sum_{i=1}^N |\psi_i\rangle\langle\psi_i|\Psi\rangle$$

The measurement corresponding to the operator $\hat{\Psi}$, projects the quantum system initially in the state $|\Psi\rangle$ onto one of the eigenstates $|\psi_i\rangle$. In other words, a measurement on a quantum system is essentially a filtering process that places the state of the quantum system into one of the eigenstates in the linear superposition at the time of the measurement. For example, an electron with an unknown z-coordinate spin orientation prior to a measurement corresponding to the operator $\hat{S}_z$ is represented in a linear superposition of states:

$$|\Psi\rangle = c_1|\uparrow\rangle + c_2|\downarrow\rangle$$

A spin determination measurement $\hat{S}_z$ projects the state of the electron onto either the state $|\uparrow\rangle$ or the state $|\downarrow\rangle$ at the time of the measurement. In other words, just after the spin determination measurement, the electron is either in the state $|\uparrow\rangle$ or the state $|\downarrow\rangle$.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

$$Pr(\psi_i) = |c_i|^2 = |\langle \psi_i | \Psi \rangle|$$

where $|\Psi\rangle$ is normalized, and $|c_i|^2$ equals $c_i^* c_i$ and gives the outcome probability. For example, prior to a spin determination measurement in the spin basis $\{|\uparrow\rangle, |\downarrow\rangle\}$ consider an electron coherently prepared with a ½ probability of being found in the spin state $|\uparrow\rangle$ and a ½ probability of being found in the spin state $|\downarrow\rangle$. The state associated with the electron in such a spin state prior to a spin determination measurement can be represented by:

$$|\Psi\rangle = \frac{1}{\sqrt{2}}|\uparrow\rangle + \frac{1}{\sqrt{2}}|\downarrow\rangle$$

Quantum systems comprising just two basis states can, in general, be represented by "$|0\rangle$" and "$|1\rangle$." Examples of two-state quantum systems include vertical and horizontal polarization states of an electromagnetic field, two energy states of an atomic system, and the two spin states of an electron or atomic nucleus already described. A quantum system with two discrete states is called a "qubit system," and the states $|0\rangle$ and $|1\rangle$, called "qubit basis states," can also be represented in set notation as $\{|0\rangle, |1\rangle\}$. The infinite number of states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $0 \leq \theta < \pi$, and $0 \leq \phi < 2\pi$.

Figure 2:
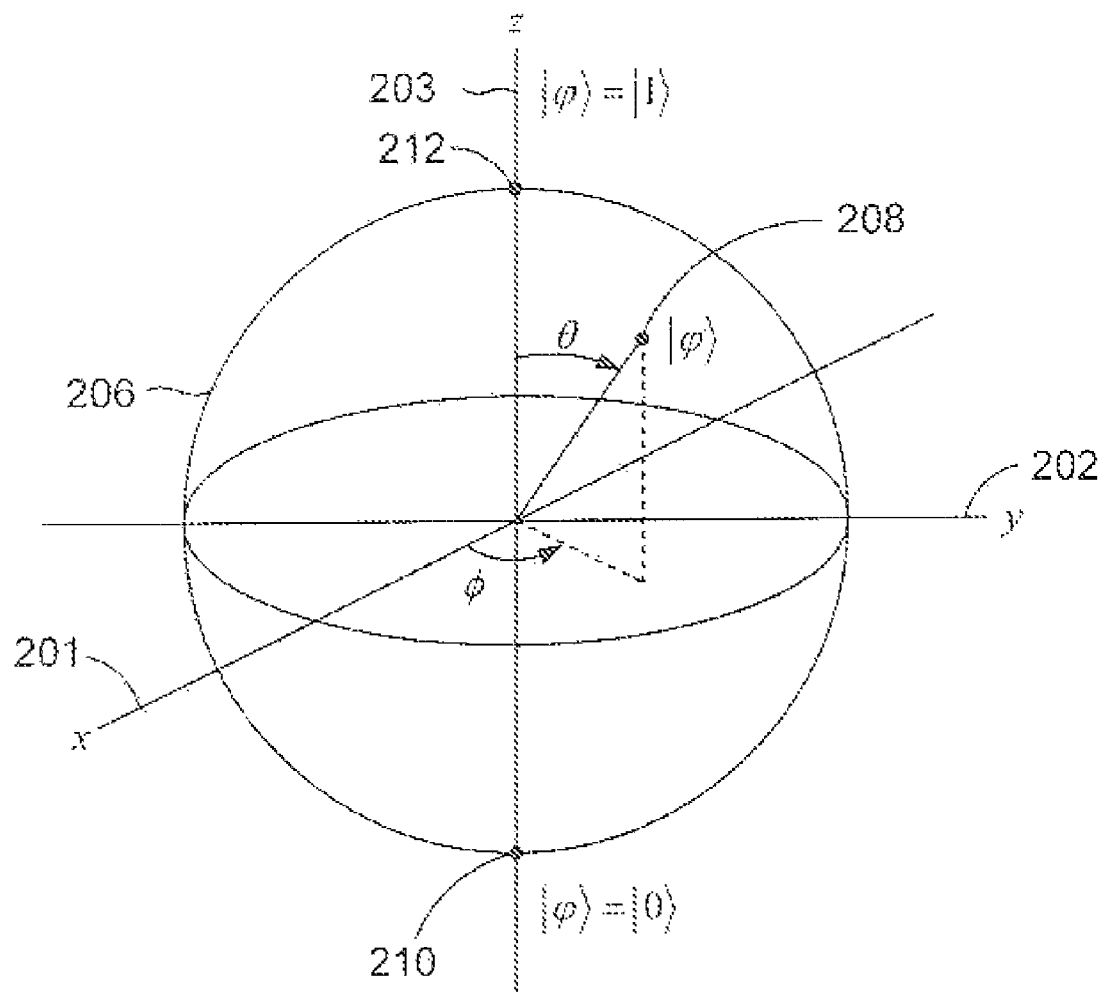
FIG. 2 illustrates a Bloch sphere representation of a qubit system.

FIG. 2 illustrates a Bloch sphere representation of a qubit system. As shown in FIG. 2, lines 201-203 are orthogonal x, y, and z Cartesian coordinate axes, respectively, and a Bloch sphere 206 is centered at the origin. There are an infinite number of points on the Bloch sphere 206, each point representing a unique state of a qubit system. For example, a point 208 on the Bloch sphere 206 represents a unique state of a qubit system that simultaneously comprises, in part, the state $|0\rangle$ and, in part, the state $|1\rangle$. However, once the state of the qubit system is measured in the basis $\{|0\rangle, |1\rangle\}$, the state of the qubit system is projected onto the state $|0\rangle$ 210 or onto the state $|1\rangle$ 212.

The expectation value of a measurement performed on a quantum system that is represented by the linear superposition of states $|\Psi\rangle$ is mathematically represented by:

$$\langle \hat{\Psi} \rangle = \langle \Psi | \hat{\Psi} | \Psi \rangle$$

and is determined by applying the completeness relation as follows:

$$\langle \hat{\Psi} \rangle = \sum_{i=1}^{N} \sum_{j=1}^{N} \langle \Psi | \psi_i \rangle \langle \psi_i | \hat{\Psi} | \psi_j \rangle \langle \psi_j | \Psi \rangle$$

$$= \sum_{i=1}^{N} \psi_i |\langle \psi_i | \Psi \rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue obtained from the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

The expectation value of a single quantum system in a state $|\Psi\rangle$ can also be described using a density operator defined by:

$$\hat{\rho} = |\Psi\rangle\langle\Psi|$$

where the state $|\Psi\rangle$ is also called a "pure state," which is distinguished from a statistical mixture of states described below. The density operator is represented in the $\{|\psi_i\rangle\}$ basis by a matrix called the "density matrix" whose matrix elements are:

$$\rho_{ij} = \langle \psi_i | \hat{\rho} | \psi_j \rangle = c_i^* c_j$$

The density operator characterizes the state of the quantum system. In other words, the density operator provides all the physical information that can be calculated from the state $|\Psi\rangle$. For example, the sum of the diagonal matrix elements of the density matrix is given by:

$$\sum_i |c_i|^2 = \sum_i \rho_{ii} = Tr(\rho) = 1$$

where Tr represents the trace, or sum of the diagonal elements, of a matrix. For example, the density matrix of a two-state quantum system in the pure state:

$$|\Psi\rangle = c_1|\psi_1\rangle + c_2|\psi_2\rangle$$

is given by:

$$\rho = \begin{bmatrix} c_1 c_1^* & c_1 c_2^* \\ c_2 c_1^* & c_2 c_2^* \end{bmatrix}$$

where the diagonal elements are the probabilities associated with projecting the quantum system into either the state $|\psi_1\rangle$ or the state $|\psi_2\rangle$, and the off-diagonal elements represent the interference effects between the states $|\psi_1\rangle$ and $|\psi_2\rangle$. In addition, the expectation value of a quantum system in the state $|\Psi\rangle$ can be expressed as:

$$\langle \hat{\Psi} \rangle = \sum_{i,j} \langle \psi_j | \Psi \rangle \langle \Psi | \psi_i \rangle \langle \psi_i | \hat{\Psi} | \psi_j \rangle$$

$$= \sum_{i,j} \langle \psi_j | \hat{\rho} | \psi_i \rangle \langle \psi_i | \hat{\Psi} | \psi_j \rangle$$

$$= Tr\{\hat{\rho}\hat{\Psi}\}$$

However, it is often the case that information about a quantum system is incomplete. For example, a quantum system can be in any one of the states $|\Psi_1\rangle, |\Psi_2\rangle, |\Psi_3\rangle, \ldots$, each with an associated probability $p_1, p_2, p_3, \ldots$, where the probabilities satisfy the conditions:

$$0 \leq p_1, p_2, p_3, \ldots \leq 1, \text{ and}$$

$$\sum_i p_i = 1$$

The quantum system is said to exist in a "statistical mixture of states." The density operator for a statistical mixture of states can be determined as follows. As described above, the probability that a measurement of the observable $\hat{\Psi}$ on a quantum system in the pure state $|\Psi_i\rangle$ yields a result $\psi_n$ is:

$$Pr_i(\psi_n) = \langle \Psi_i | \psi_n \rangle \langle \psi_n | \Psi_i \rangle = \langle \psi_n | \Psi_i \rangle^2$$

However, the probability $Pr(\psi_n)$ of observing $\psi_n$ in a statistical mixture of states is weighted by $p_i$ and the summed over $i$ to give:

$$Pr(\psi_n) = \sum_i p_i Pr_i(\psi_n)$$

$$= \sum_i p_i \langle \psi_n | \Psi_i \rangle \langle \Psi_i | \psi_n \rangle$$

$$= \langle \psi_n | \hat{\rho} | \psi_n \rangle$$

where $$\hat{\rho} = \sum_i p_i |\Psi_i\rangle \langle \Psi_i|$$

is the density operator associated with a statistical mixture of states. The associated density matrix elements are given by:

$$\rho_{np} = \langle \psi_n | \sum_i p_i |\Psi_i\rangle \langle \Psi_i| | \psi_p \rangle$$

$$= \sum_i p_i c_n^{(i)} c_p^{(i)*}$$

The physical meaning of the density matrix is described for a two-state quantum system comprising a mixture of states:

$$|\Psi_i\rangle = c_1^{(i)}|\psi_1\rangle + c_2^{(i)}|\psi_2\rangle$$

The corresponding density matrix is given by:

$$\rho = \begin{bmatrix} \rho_{11} & \rho_{12} \\ \rho_{21} & \rho_{22} \end{bmatrix}$$

$$= \begin{bmatrix} \sum_i p_i c_1^{(i)} c_1^{(i)*} & \sum_i p_i c_1^{(i)} c_2^{(i)*} \\ \sum_i p_i c_2^{(i)} c_1^{(i)*} & \sum_i p_i c_2^{(i)} c_2^{(i)*} \end{bmatrix}$$

The diagonal matrix elements can be interpreted to mean that when the state of the quantum system is $|\Psi_i\rangle$, the diagonal matrix element $\rho_{11}$ represents the average probability of finding the quantum system in the state $|\psi_1\rangle$, and the diagonal matrix element $\rho_{22}$ represents the average probability of finding the quantum system in the state $|\psi_2\rangle$. When the same measurement is carried out N times under identical conditions, $N\rho_{11}$ will be found in the state $|\psi_1\rangle$ and $N\rho_{22}$ will be found in the state $|\psi_2\rangle$. The off-diagonal elements $\rho_{12}$ and $\rho_{21}$ express the average interference effects between the states $|\psi_1\rangle$ and $|\psi_2\rangle$. Note that unlike the diagonal matrix elements, the off-diagonal matrix elements can be zero even though neither of the products $c_1^{(i)}c_2^{(i)*}$ and $c_2^{(i)}c_1^{(i)*}$ is zero, which means that the average over N measurements has cancelled out the interference effects of the states $|\psi_1\rangle$ and $|\psi_2\rangle$. Note that the density operator of any pure quantum state is equal to its own square. Any density operator not equal to its own square contains some level of statistical mixture. Such states are often referred to as "mixed states".

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi} \otimes \hat{\Xi})(|\psi\rangle \otimes |\xi\rangle) = (\hat{\Psi}|\psi\rangle) \otimes (\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle \otimes |\xi\rangle$ can be abbreviated as $|\psi\rangle|\xi\rangle$, $|\psi,\xi\rangle$, or $|\psi\xi\rangle$. For example, the spin states of two electrons in an atomic orbital are bases for a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow,\uparrow\rangle_{12} = |\uparrow\uparrow\rangle_{12}$$

where the subscripts 1 and 2 refer to the first and second electrons.

An Overview of Electromagnetic Radiation and Quantum Optics

Embodiments of the present invention employ concepts in electromagnetic radiation and quantum optics. In this subsection, a brief description of electromagnetic radiation and quantum optics that relates to embodiments of the present invention is described. Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2}\frac{\partial^2 \vec{A}}{\partial t^2} = 0$$

and the Coulomb, non-relativistic gauge condition:

$$\Lambda \cdot \vec{A}(\vec{r},t) = 0$$

where the electric and magnetic field components are determined by:

$$\vec{E}(\vec{r},t) = -\frac{\partial \vec{A}(\vec{r},t)}{\partial t}, \text{ and}$$

$$\vec{B}(\vec{r},t) = \nabla \times \vec{A}(\vec{r},t)$$

Figure 3:
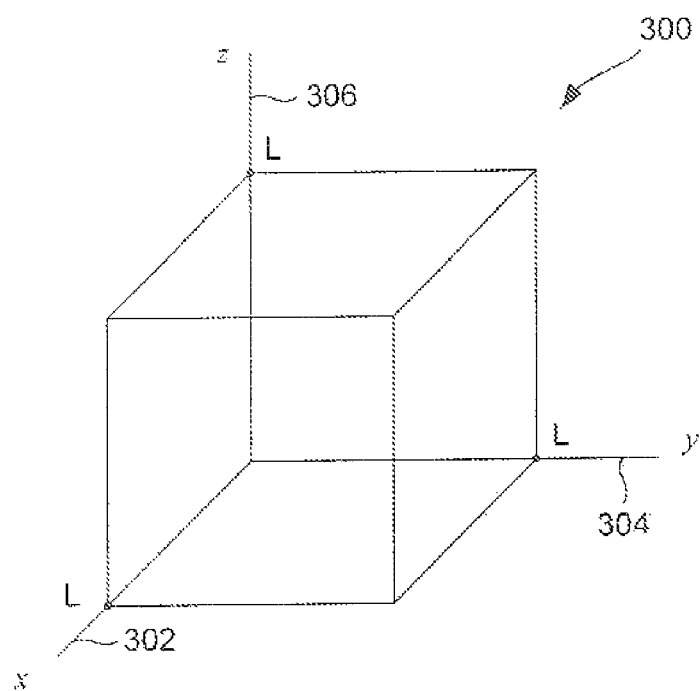
FIG. 3 illustrates a cubic cavity.

The electromagnetic radiation is assumed to be propagating and is subject to periodic boundary conditions imposed by a cubic, or quantization, cavity with perfectly reflecting walls, where the walls are of length L. FIG. 3 illustrates a cubic cavity 300. Orthogonal axes 302, 304, and 306 represent the x, y, and z Cartesian coordinate axes. The finite dimensional cubic cavity 300 imposes periodic boundary conditions on solutions to the wave equation. For example, in the x, y, and z-directions, plane wave solutions to the vector potential wave equation satisfy the condition:

$$\exp(i\vec{k}\cdot\vec{r}) = \exp(i\vec{k}\cdot(\vec{r}+\vec{L}))$$

where $\vec{L}$ is vector (L, L, L), and
$\vec{k}$ is called the "wavevector" with components:

$$\vec{k} = \frac{2\pi}{L}(m_x, m_y, m_z), \text{ and}$$

$m_x$, $m_y$, and $m_z$ are integers.

Each set of integers ($m_x$, $m_y$, $m_z$) specifies a normal mode of the electromagnetic radiation, and the magnitude of the wavevector $\vec{k}$, k, is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A propagating vector potential solution to the wave equation above that satisfies the periodic boundary conditions is:

$$A(r,t) = \sum_{\vec{k},s} \vec{e}_{\vec{k}s}\left(A_{\vec{k}s} e^{i(\vec{k}\cdot\vec{r}-\omega_k t)} + A^*_{\vec{k}s} e^{-i(\vec{k}\cdot\vec{r}-\omega_k t)}\right)$$

where
$A_{\vec{k}s}$ is a complex amplitude of the electromagnetic radiation;
$\vec{e}_{\vec{k}s}$ represents two unit-length polarization vectors; and
$m_x$, $m_y$, $m_z$ = 0, ±1, ±2, ±3, ....

The sum over $\vec{k}$ represents the sum over the integers ($m_x$, $m_y$, $m_z$), and the sum over s is the sum over the two independent polarizations that are associated with each $\vec{k}$. The two polarization vectors are orthogonal as indicated by:

$$\vec{e}_{\vec{k}s} \cdot \vec{e}_{\vec{k}s'} = \delta_{ss'},$$

and from the gauge condition given above:

$$\vec{k} \cdot \vec{e}_{\vec{k}s} = 0,$$

for both polarization directions s. The two polarization vectors $\vec{e}_{\vec{k}1}$ and $\vec{e}_{\vec{k}2}$ form a right-handed coordinate system with a normalized wavevector given by:

$$\vec{e}_{\vec{k}1} \times \vec{e}_{\vec{k}2} = \frac{\vec{k}}{|\vec{k}|} = \vec{\kappa}$$

Figure 4:
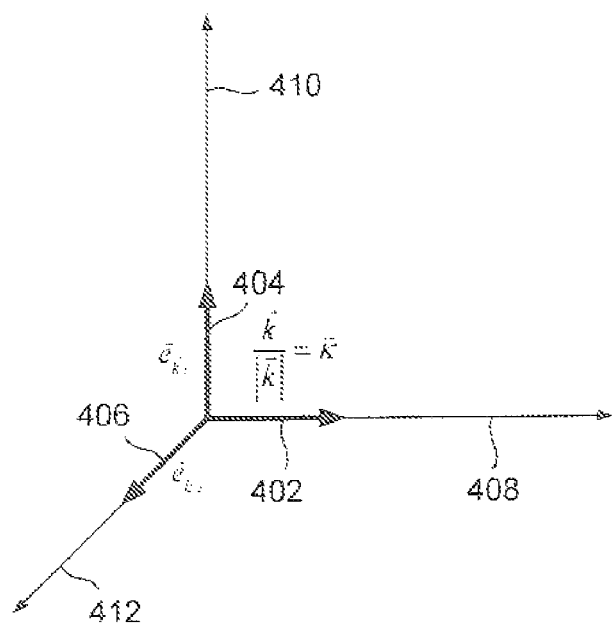
FIG. 4 illustrates a three-dimensional coordinate system with two independent polarization vectors and a normalized wavevector as basis vectors.

FIG. 4 illustrates a three-dimensional right-handed coordinate system with two independent polarization vectors $\vec{e}_{\vec{k}s}$ and a normalized wavevector $\vec{\kappa}$ as basis vectors. In FIG. 4, the wavevector $\vec{\kappa}$ 402, and the polarization vectors, $\vec{e}_{\vec{k}1}$ 404 and $\vec{e}_{\vec{k}2}$ 406, are three orthogonal unit length basis vectors of a coordinate system with coordinate axes represented by lines 408, 410, and 412, respectively.

The propagating electric and magnetic field components of the vector potential are:

$$\vec{E}(\vec{r},t) = i\sum_{\vec{k},s} \omega_k \vec{e}_{\vec{k}s}\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right], \text{ and}$$

$$\vec{B}(\vec{r},t) = \frac{i}{c}\sum_{\vec{k},s} \omega_k (\vec{\kappa}\times\vec{e}_{\vec{k}s})\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right]$$

Both the electric field $\vec{E}(\vec{r},t)$ and magnetic field $\vec{B}(\vec{r},t)$ are propagating wave solutions referred to as the "classical" representation of the electric and magnetic field, are orthogonal to one another, and are both orthogonal to the wavevector $\vec{k}$.

Figure 5:
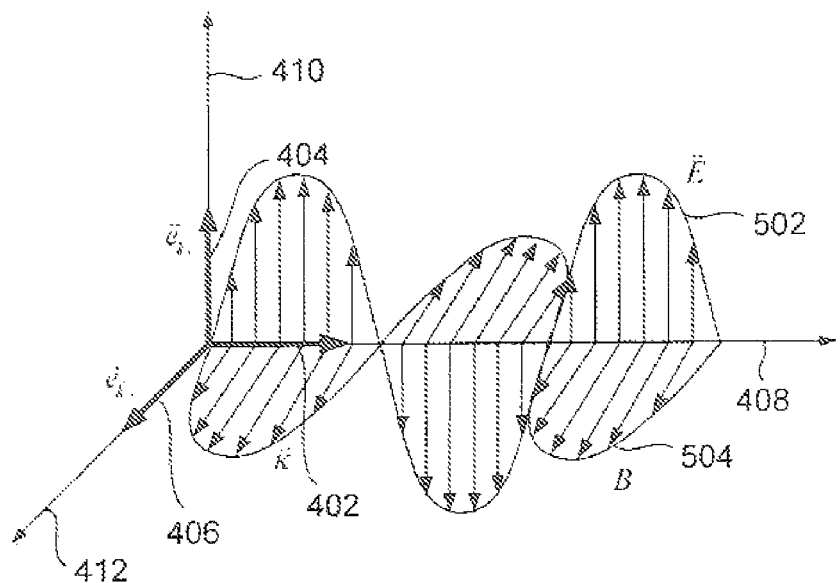
FIG. 5 illustrates a representation of electric and magnetic field components of electromagnetic radiation in the coordinate system shown in FIG. 4.

FIG. 5 illustrates a representation of electric and magnetic field components of electromagnetic radiation in the right-handed coordinate system shown in FIG. 4. The electromagnetic radiation is directed along the wavevector $\vec{\kappa}$ 402 axis. The electric field component $\vec{E}(\vec{r},t)$ 502 and magnetic field component $\vec{B}(\vec{r},t)$ 504 are directed along the orthogonal polarization vectors $\vec{e}_{\vec{k}1}$ 404 and $\vec{e}_{\vec{k}2}$ 406, respectively, and appear frozen at a particular time t.

The energy of the electromagnetic radiation can be determined by evaluating the Hamiltonian:

$$H = \frac{1}{2}\int_V \left(\varepsilon_0 \vec{E}\cdot\vec{E} + \frac{1}{\mu_0}\vec{B}\cdot\vec{B}\right)dV$$

$$= 2\varepsilon_0 V \sum_{\vec{k},s} \omega_k^2 A_{\vec{k}s} A_{\vec{k}s}^*,$$

where $\varepsilon_0$ is the electric permittivity of free space,
$\mu_0$ is the magnetic permeability of free space, and
V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\varepsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\vec{E}(\vec{r},t)$ and magnetic field $\vec{B}(\vec{r},t)$ components, the canonical variables for position, $q_{\vec{k}s}$, and momentum, $p_{\vec{k}s}$, are introduced into the Hamiltonian by setting:

$$A_{\vec{k}s} = \frac{1}{2\omega_k\sqrt{\varepsilon_0 V}}(\omega_k q_{\vec{k}s} + i p_{\vec{k}s})$$

As a result, the Hamiltonian for the electromagnetic radiation becomes:

$$H = \frac{1}{2}\sum_{\vec{k},s}(p_{\vec{k}s}^2 + \omega_k^2 q_{\vec{k}s}^2)$$

Each term in the Hamiltonian is the energy of a harmonic oscillator with vibrational mode $\vec{k}s$, where the term $p_{\vec{k}s}^2/2$ is the kinetic energy, and the term $\omega_k q_{\vec{k}s}^2/2$ is the potential energy of a harmonic oscillator with a unit mass. The Hamiltonian is quantized by replacing the position and momentum variables $q_{\vec{k}s}$ and $p_{\vec{k}s}$ with quantum mechanical position and momentum operators $\hat{q}_{\vec{k}s}$ and $\hat{p}_{\vec{k}s}$, respectively, to give the quantum Hamiltonian operator:

$$\hat{H} = \frac{1}{2}\sum_{\vec{k},s}(\hat{p}_{\vec{k}s}^2 + \omega_k^2 \hat{q}_{\vec{k}s}^2)$$

Annihilation and creation operators are defined by:

$$\hat{a}_{\vec{k}s} = \frac{1}{\sqrt{2\hbar\omega_k}}(\omega_k\hat{q}_{\vec{k}s} + i\hat{p}_{\vec{k}s}), \text{ and}$$

$$\hat{a}_{\vec{k}s}^\dagger = \frac{1}{\sqrt{2\hbar\omega_k}}(\omega_k\hat{q}_{\vec{k}s} - i\hat{p}_{\vec{k}s}),$$

and substituting the annihilation and creation operators in the quantum Hamiltonian operator gives:

$$\hat{H} = \sum_{\vec{k},s}\hbar\omega_k\left(\hat{a}_{\vec{k}s}^\dagger \hat{a}_{\vec{k}s} + \frac{1}{2}\right),$$

where $$\hat{a}_{\vec{k}s}^\dagger \hat{a}_{\vec{k}s}$$

is called the "number operator" and is also denoted by $\hat{n}_{\vec{k}s}$. Using the canonical commutation relations for the position and momentum operators, the annihilation and creation operators satisfy the commutation relations given by:

$$[\hat{a}_{\vec{k}s}, \hat{a}_{\vec{k}'s'}] = 0 = [\hat{a}_{\vec{k}s}^\dagger, \hat{a}_{\vec{k}'s'}^\dagger], \text{ and}$$

$$[\hat{a}_{\vec{k}s}, \hat{a}_{\vec{k}'s'}^\dagger] = \delta_{\vec{k}\vec{k}'}\delta_{ss'}$$

When the electromagnetic radiation is quantized, the amplitudes $A_{\vec{k}s}$ become operators:

$$\hat{A}_{\vec{k}s} = \sqrt{\frac{\hbar}{2\omega_k\varepsilon_0 V}}\,\hat{a}_{\vec{k}s},$$

which can be substituted in the classical electric and magnetic field equations above to obtain electric and magnetic field operators:

$$\hat{E}(\vec{r},t) = i\sum_{\vec{k},s}\sqrt{\frac{\hbar\omega}{2\varepsilon_0 V}}\,e_{\vec{k}s}[\hat{a}_{\vec{k}s}e^{i(\vec{k}\cdot\vec{r}-\omega_k t)} - \hat{a}_{\vec{k}s}^\dagger e^{-i(\vec{k}\cdot\vec{r}-\omega_k t)}], \text{ and}$$

$$\hat{B}(\vec{r},t) = \frac{i}{c}\sum_{\vec{k},s}(\hat{k}\times e_{\vec{k}s})\sqrt{\frac{\hbar\omega}{2\varepsilon_0 V}}\,e_{\vec{k}s}[\hat{a}_{\vec{k}s}e^{i(\vec{k}\cdot\vec{r}-\omega_k t)} - \hat{a}_{\vec{k}s}^\dagger e^{-i(\vec{k}\cdot\vec{r}-\omega_k t)}]$$

Both the electric and magnetic field operators are Hermitian and represent measurable electric and magnetic fields.

The electric field accounts for most of the interactions with matter, because the magnitude of the magnetic field is smaller than the electric field by the factor 1/c. As a result, the electric field alone is generally used to characterize the behavior of electromagnetic radiation and any interactions with charged matter, and the magnetic field component can be ignored.

Quantum computation and quantum information processing systems can be operated using a single-mode $\vec{k}s$ of electromagnetic radiation. As a result, the Hamiltonian operator for a single-mode of electromagnetic radiation reduces to:

$$\hat{H} = \hbar\omega\left(\hat{a}^\dagger\hat{a} + \frac{1}{2}\right),$$

where $\hat{a}$ and $\hat{a}^\dagger$ replace the mode-dependent operators $\hat{a}_{\vec{k}_j s_j}$ and $$\hat{a}_{\vec{k}_j s_j}^\dagger$$

in the Hamiltonian above. The eigenstates and the corresponding energy eigenvalues of the single-mode Hamiltonian are:

$$\hat{H}|n\rangle = \hbar\omega\left(\hat{a}^\dagger\hat{a} + \frac{1}{2}\right)|n\rangle = E_n|n\rangle,$$

where $|n\rangle$ is called a "number state," n is a nonnegative integer called a "photon number," and $E_n$ is an energy eigenvalue.

The annihilation and creation operators operate on a number state as follows:

$$\hat{a}|n\rangle = \sqrt{n}|n-1\rangle,$$

$$\hat{a}^\dagger|n\rangle = \sqrt{n+1}|n+1\rangle, \text{ and}$$

$$\hat{n}|n\rangle = n|n\rangle,$$

where h represents the operator $\hat{a}^\dagger\hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle,$$

where $|0\rangle$ is called the "vacuum state" and represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$$\langle n'|n\rangle = \delta_{n'n}, \text{ and}$$

$$\sum_{n=0}^{\infty}|n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle.$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle, \text{ and}$$

$$\hat{H}(\hat{a}^\dagger|n\rangle) = \hbar\omega\left(n + \frac{3}{2}\right)|n+1\rangle = (E_n + \hbar\omega)|n+1\rangle,$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 6:
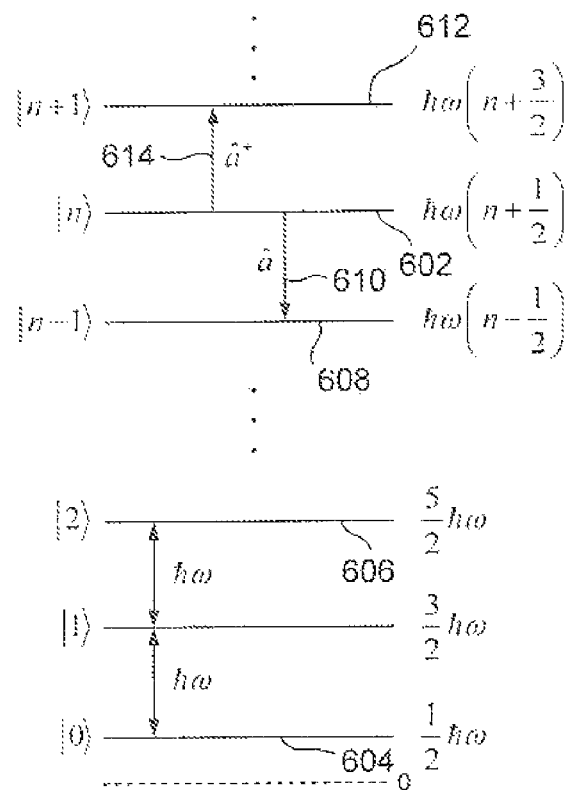
FIG. 6 is an energy-level diagram of quantized electromagnetic radiation.

FIG. 6 is an energy level diagram of quantized electromagnetic radiation. Horizontal lines, such as horizontal line 602, represent energy levels of electromagnetic radiation. Energy level 604 is the lowest energy level, which corresponds to the vacuum state $|0\rangle$. The energy of the vacuum state is $\hbar\omega/2$ or ½ the energy of a single photon. Higher energy levels of electromagnetic radiation are each separated by the same quantum of energy $\hbar\omega$. For example, the energy level 606 represents electromagnetic radiation with a total electromagnetic energy of $5\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator $\hat{a}$ represents an electromagnetic-radiation transition 610 from the state $|n\rangle$ 602 to the lower energy state $|n-1\rangle$ 608. The transition 610 is achieved by giving up a photon to the surroundings. By contrast, the creation operator $\hat{a}^\dagger$ represents an electromagnetic-radiation transition 614 from the state $|n\rangle$ 602 to the higher energy state $|n+1\rangle$ 612. The transition 614 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{\frac{1}{4}} \exp\{-i\omega_0 t - \Delta^2(t_0 - t)^2\},$$

where
- $\omega_0$ is the central frequency of the pulse spectrum,
- t is time,
- $t_0$ is the time at which the peak of the wavepacket is located at a distance $z_0$ from the photon source, and
- $\Delta^2$ is the variance of the intensity spectrum.

The time to can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt |\xi(t)|^2 = 1$$

The probability of photodetection of a photon in the time interval $(t_1, t_2)$ at a distance $z_0$ from the photon source is given by:

$$\text{Probability of } (t_1 < t_2) = \int_{t_1}^{t_2} dt |\xi(t)|^2$$

The time dependent creation operators can be used to generate a photon wavepacket creation operator as follows:

$$\hat{a}_\xi^\dagger = \int_{-\infty}^{\infty} dt \xi(t) \hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}} |0\rangle,$$

where $|0\rangle$ is the continuous-mode vacuum state. The continuous-mode number states satisfy the following same conditions:

$$\hat{n} | n_\xi \rangle = n | n_\xi \rangle,$$

$$\langle n'_\xi | n_\xi \rangle = \delta_{n'n}, \text{ and}$$

$$\sum_{n_\xi=0}^{\infty} |n_\xi\rangle \langle n_\xi| = 1$$

As a result, the subscript $\xi$ used to identify continuous-mode number states can be dropped. Note that the wavepacket constructed photon is not an eigenstate of any Hamiltonian.

An Overview of Quantum Entanglement

Embodiments of the present invention employ entangled quantum states. The section provides a brief description of quantum entanglement, which is a quantum mechanical phenomenon in which the quantum states of two or more systems are correlated. A quantum system comprising a first quantum subsystem and a second quantum subsystem has a Hilbert space $H_A \otimes H_B$, where $H_A$ is a Hilbert space associated with the first quantum system, and $H_B$ is a Hilbert space associated with the second quantum system. The kets $|i\rangle_A$ represent the orthonormal eigenstates of the Hilbert space $H_A$, and the kets $|j\rangle_B$ represents the orthonormal eigenstates of the Hilbert space $H_B$, where i and j are positive integers. Any linear superposition of states in the Hilbert space $H_A \otimes H_B$ is given by:

$$|\Psi\rangle_{AB} = \sum_{i,j} c_{ij} |i\rangle_A |j\rangle_B,$$

where the amplitudes $c_{ij}$ are complex numbers satisfying the condition:

$$\sum_{ij} |c_{ij}|^2 = 1$$

Special kinds of linear superpositions of states $|\Psi\rangle_{AB}$ are called "direct product states" and are represented by the product:

$$|\Psi\rangle_{AB} = |\psi\rangle_A |\psi\rangle_B = \left(\sum_i c_i^{(A)} | i\rangle_A \right)\left(\sum_j c_j^{(B)} | j\rangle_B \right),$$

where
- $|\psi\rangle_A$ is a normalized linear superposition of states in the Hilbert space $H_A$;
- and $|\psi\rangle_B$ is a normalized linear superposition of states in the Hilbert space $H_B$.

For example, the state of a combined qubit system comprising two qubit systems is represented by a product of qubits as follows:

$$|\psi\rangle_{12} = |\psi\rangle_1 |\psi\rangle_2$$

where the state of the first qubit system is:

$$|\psi\rangle_1 = \frac{1}{\sqrt{2}} (|0\rangle_1 + |1\rangle_1)$$

and the state of the second qubit system is:

$$|\psi\rangle_2 = \frac{1}{\sqrt{2}} (|0\rangle_2 + |1\rangle_2)$$

The state $|\psi\rangle_2$ can also be written as a linear superposition of states:

$$|\psi\rangle_{12} = |\psi\rangle_1 |\psi\rangle_2$$

$$= \frac{1}{2} (|0\rangle_1 |0\rangle_2 + |0\rangle_1 |1\rangle_2 + |1\rangle_1 |0\rangle_2 + |1\rangle_1 |1\rangle_2)$$

where the terms $|0\rangle_1 |0\rangle_2$, $|0\rangle_1 |1\rangle_2$, and $|1\rangle_1 |1\rangle_2$ are product states. Each product state in the state $|\psi\rangle_2$ has an associated coefficient of ½, which indicates that when the state of the first qubit system is measured in the bases $\{|0\rangle_1, |1\rangle_1\}$, and the state of the second qubit system is measured in the basis $\{|0\rangle_2, |1\rangle_2\}$, there is a ¼ probability of the combined qubit systems being found in any one of the product states. For example, when the states of the first and the second qubit systems are measured in the bases $\{|0\rangle_1, |1\rangle_1\}$ and $\{|0\rangle_2, |1\rangle_2\}$, respectively, there is a ¼ ($|½|^2$) probability of projecting the state of the combined qubit system onto the product state $|1\rangle|1\rangle_2$.

However, other linear superpositions in the Hilbert space $H_A \otimes H_B$ cannot be written as a product state are entangled states. In general, for a Hilbert space comprising two or more quantum subsystems, an entangled state is a linear superposition of states that cannot be written as a direct product state. For example, an entangled state representation of an entangled two-qubit system can be:

$$|\phi\rangle_{12} = \frac{1}{\sqrt{2}}(|0\rangle_1|1\rangle_2 + |1\rangle_1|0\rangle_2)$$

The state $|\phi\rangle_{12}$ cannot be factored into a product of the qubits $\alpha_1|0\rangle_1 + \beta_1|1\rangle_1$ and $\alpha_2|0\rangle_2 + \beta_2|1\rangle_2$, for any choice of the parameters $\alpha_1$, $\beta_1$, $\alpha_2$, and $\beta_2$, and is called an "entangled state."

Entanglement can be understood by examining two qubits in a pure state, by determining the purity of a reduced state of either system. The density operator of part of a composite system is found by tracing over the quantum systems not included in the part of interest. For two qubits, this means tracing over one qubit, which leaves just the density operator of the other qubit. When two qubits in a pure state are in a product state, also called a "mixed state," the reduced density operator of either qubit is always pure. When two qubits are entangled, the reduced density operator of either qubit is mixed. The von Neumann entropy can also be used to characterize the difference between an entangled state and a direct product state. The von Neumann entropy of a product state can be expressed in terms of the trace and logarithm as follows:

$$S = -Tr(\rho \log \rho)$$

where $\rho$ is the density operator. The entropy S can increase but never decrease with a measurement. For any pure two-qubit system, the entropy S is zero, and for any product state or mixed state, the entropy is not zero. For example, consider the two-qubit system represented by $|\psi\rangle_{12}$, which is a pure state because $\rho_{12}^2 = \rho_{12}$ and so the von Neumann entropy S equals zero.

The reduced density operator for the product state $|\psi\rangle_{12}$, tracing over qubit "2," is:

$$\rho_1 = Tr_2(\rho_{12})$$
$$= \langle 0|_2 \rho_{12} |0\rangle_2 + \langle 1|_2 \rho_{12} |1\rangle_2$$

where $$\rho_{12} = |\psi\rangle_{12}\langle\psi|_{12}$$

For the product state $|\psi\rangle_{12}$, $$\rho_1 = \frac{1}{2}(|0\rangle_1 + |1\rangle_1)(\langle 0|_1 + \langle 1|_1)$$

which gives $\rho_1^2 = \rho_1$. Hence, $\rho_1$ is pure and the von Neumann entropy S is zero. On the other hand, for the state $|\phi\rangle_{12}$, the reduced density operator tracing over qubit 2 is given by:

$$\rho_1 = \frac{1}{2}(|0\rangle_1\langle 0|_1 + |1\rangle_1\langle 1|_1)$$

which gives $\rho_1^2 \neq \rho_1$. Hence, $\rho_1$ is mixed and the von Neumann entropy S is not zero. For any two qubit system, when $\rho_1$ is pure, the corresponding state is unentangled, and when $\rho_1$ is mixed, the state is entangled.

An Overview of Polarization States, Half-wave Plates, and the Controlled-not Gate Embodiments of the present invention employ polarized photons, half-wave plates, and the controlled-not gate. As described above with reference to FIG. 5, an electromagnetic wave comprises both an electric field component, $\bar{E}$, and an orthogonal magnetic field component, B. However, because the amplitude of the magnetic field component $B_0$ is smaller than the amplitude of the electric field component $E_0$ by a factor of 1/c, where c represents the speed of light in free space (c=3.0×10$^8$ m/sec), the electric field component accounts for most of the electromagnetic wave interactions with matter. As a result, polarization states of electromagnetic waves are typically characterized by the electric field components alone.

Figure 7A:
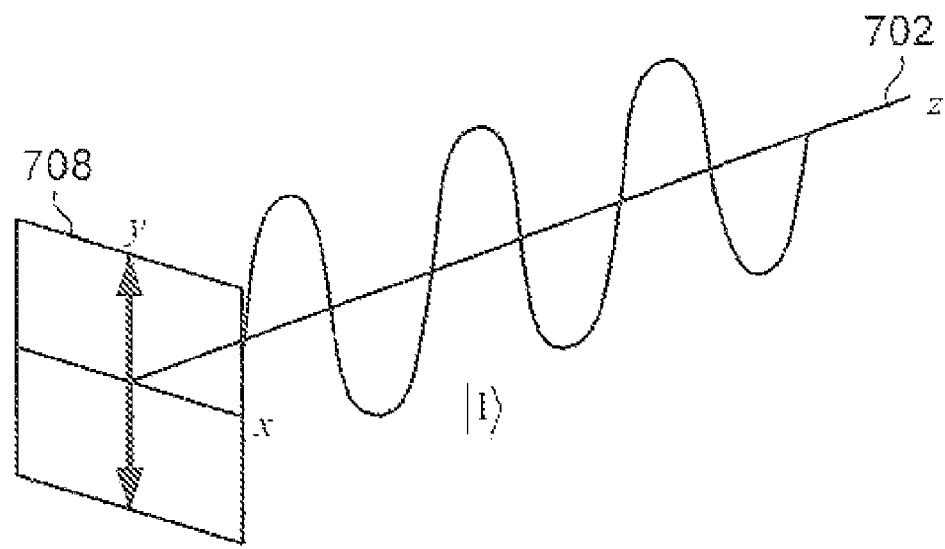
FIGS. 7A-7B illustrates vertically and horizontally polarized photon basis states.
Figure 7B:
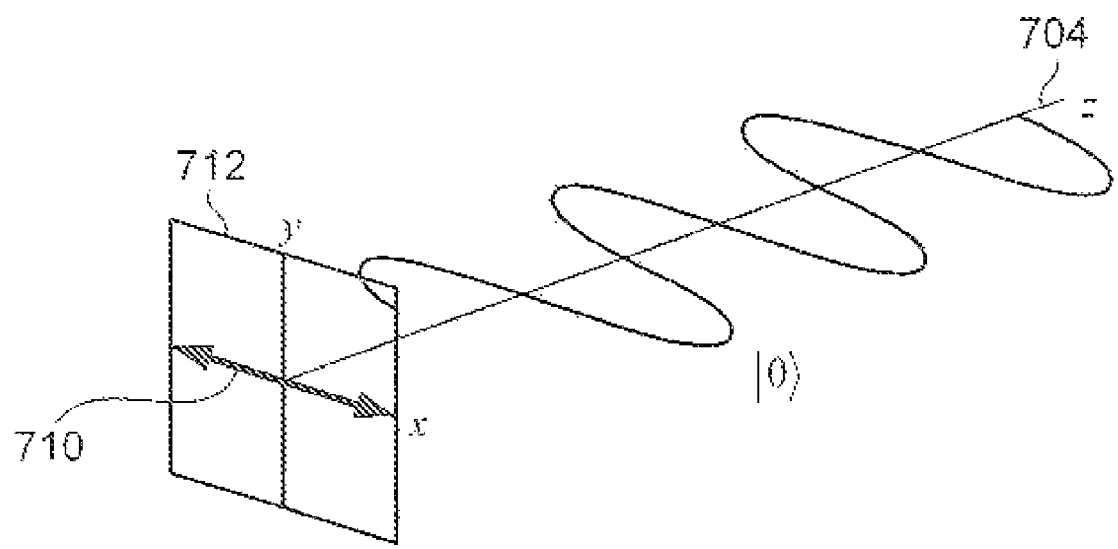

Vertically and horizontally polarized photons, represented by $|1\rangle$ and $|0\rangle$, respectively, are often used as qubit basis states. FIGS. 7A-7B illustrates vertically and horizontally polarized photon basis states, respectively. In FIGS. 7A-7B, vertically and horizontally polarized photons are represented by oscillating continuous waves propagating along z-coordinate axes 702 and 704, respectively. The terms "horizontally polarized" correspond to electric field components that lie in the xz-plane, and the terms "vertically polarized" correspond to electric field components that lie in the yz-plane. As shown in FIG. 7A, a vertically polarized photon $|1\rangle$ oscillates in the yz-plane. Directional arrow 706 in xy-plane 708 represents one complete oscillatory cycle as $|1\rangle$ advances along the z-coordinate axis 702 through one complete wavelength. In FIG. 7B, a horizontally polarized photon $|0\rangle$ oscillates in the xz-plane. Directional arrow 710 in xy-plane 712 represents one complete oscillatory cycle as $|0\rangle$ advances along the z-coordinate axis 704 through one complete wavelength.

A half-wave plate ("HWP") comprises a birefringent material that rotates the polarization of an incident linearly polarized photon by an angle that is twice the angle formed by the incident polarization and the half-wave plate fast axis. The fast axis corresponds to the direction within the HWP with the lowest refractive index. In the following discussion, the operations carried by the HWP for different fast axis angles are represented by an operator:

$$\hat{R}_\theta$$

where the subscript $\theta$ represents the fast axis angle. The HWP is also called a "quantum gate."

Figure 8A:
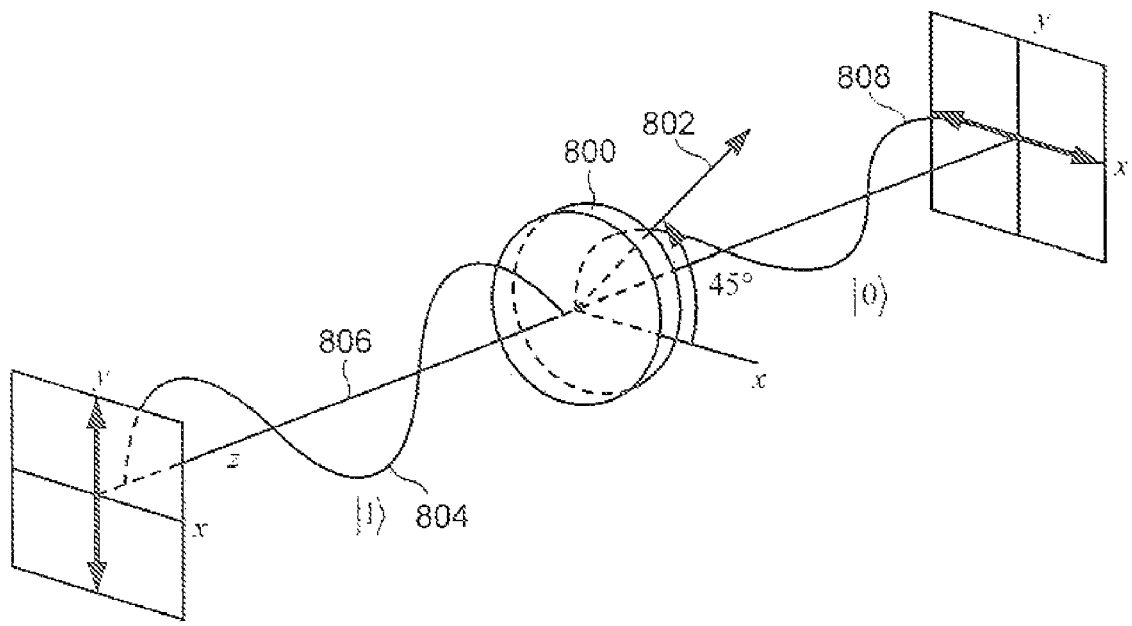
FIGS. 8A-8F illustrate polarization state changes for vertically and horizontally polarized photons incident upon half-wave plates for three different fast axis angles.
Figure 8B:
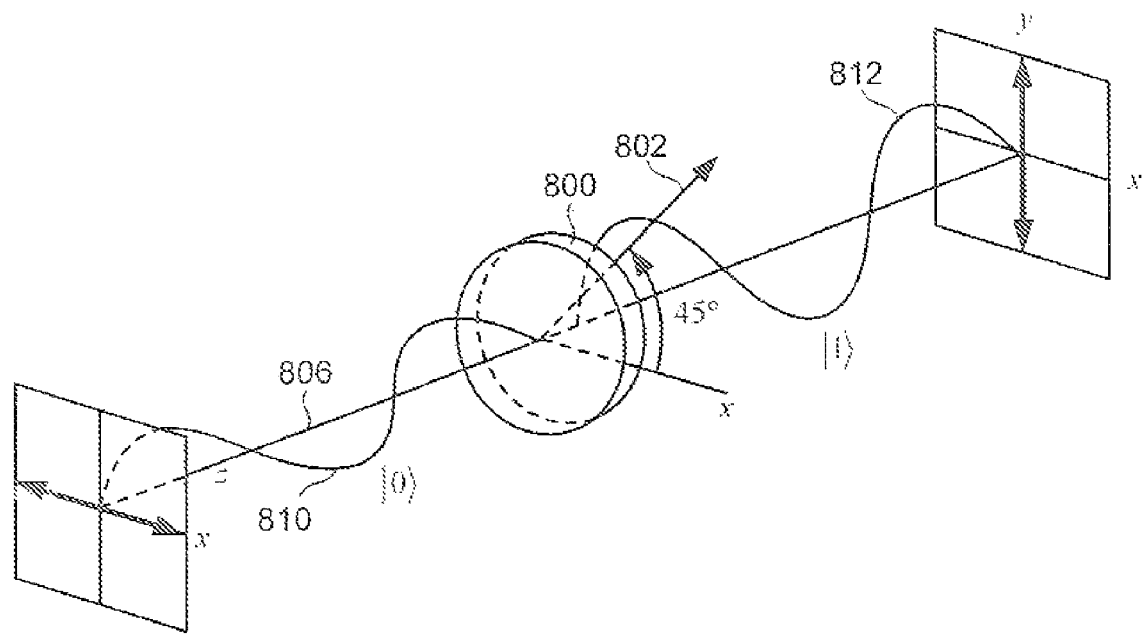

FIGS. 8A-8F illustrate polarization state changes of vertically and horizontally polarized photons incident upon HWPs that are oriented at three different fast axis angles. FIGS. 8A-8B illustrate a HWP 800 with a fast axis 802 at a 45° angle above the xz-plane. In FIG. 8A, the HWP 800 rotates a vertically polarized photon $|1\rangle$ 804 propagating along a z-coordinate axis 806 into a horizontally polarized photon $|0\rangle$ 808, which is represented by:

$$\hat{R}_{45}|1\rangle = |0\rangle$$

In FIG. 8B, the HWP 800 rotates a horizontally polarized photon $|0\rangle$ 810 into a vertically polarized photon $|1\rangle$ 812, which is represented by:

$$\hat{R}_{45}|0\rangle = |1\rangle$$

Figure 8C:
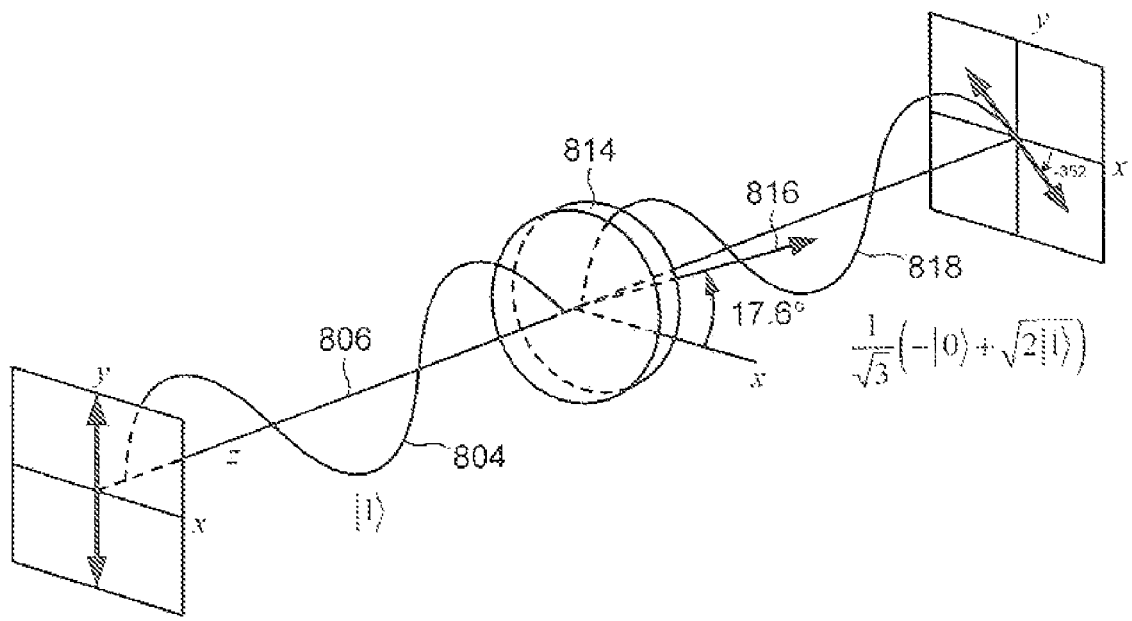
Figure 8D:
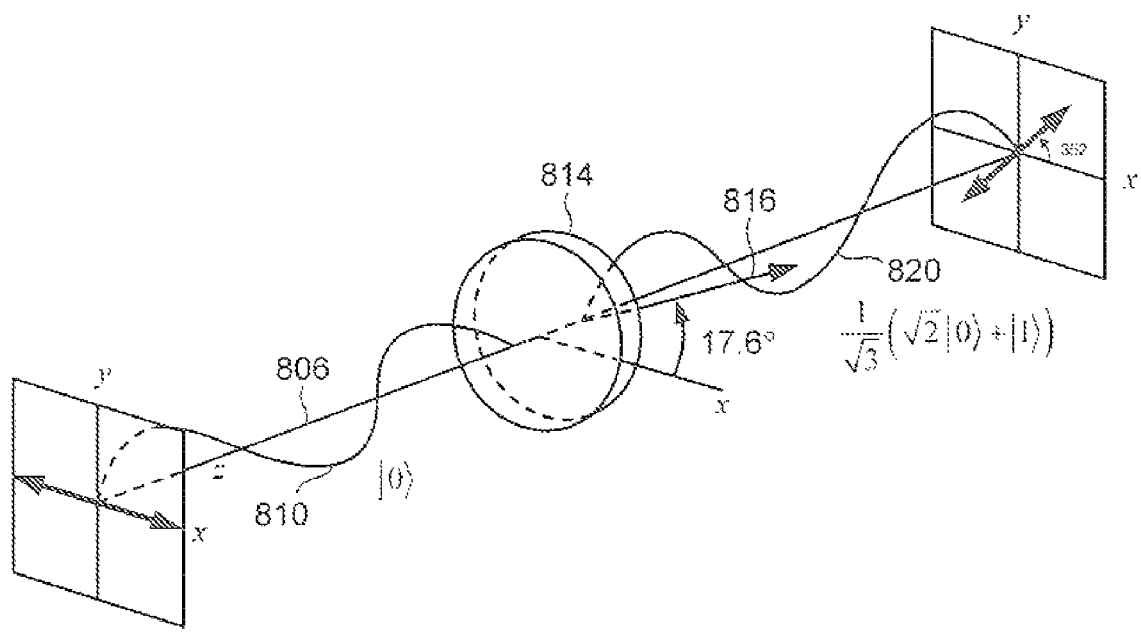

FIGS. 8C-8D illustrate a HWP 814 with a fast axis 816 at a 17.6° angle above the xz-plane. In FIG. 8C, the HWP 814 rotates the vertically polarized photon $|1\rangle$ 804 into a polarization state 818, which is represented by:

$$\hat{R}_{17.6}|1\rangle = \frac{1}{\sqrt{3}}(-|0\rangle + \sqrt{2}|1\rangle)$$

In FIG. 8D, the HWP 814 rotates the horizontally polarized photon $|0\rangle$ 810 into a photon with a polarization state 820, which is represented by:

$$\hat{R}_{17.6}|0\rangle = \frac{1}{\sqrt{3}}(\sqrt{2}|0\rangle + |1\rangle)$$

Figure 8E:
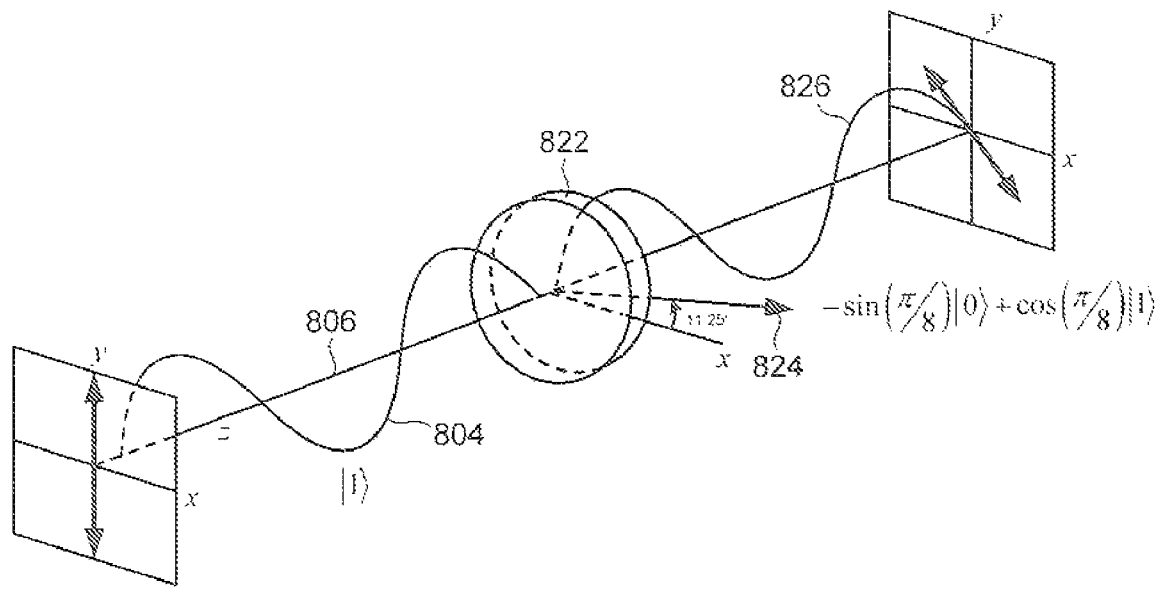
Figure 8F:
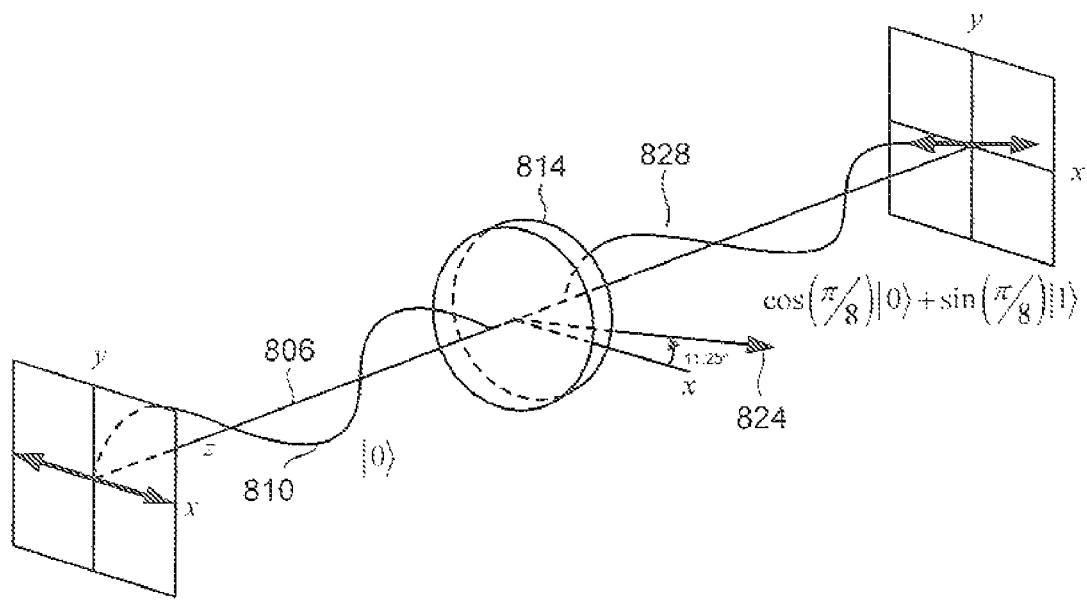
Figure 10A:
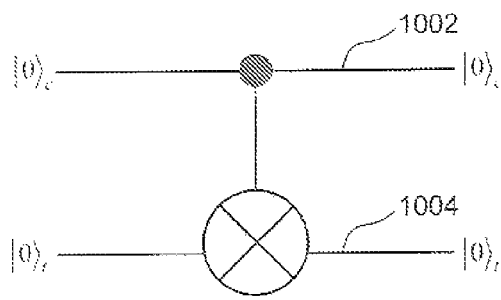
FIGS. 10A-10D show a quantum gate representation of a controlled-not gate.
Figure 10B:
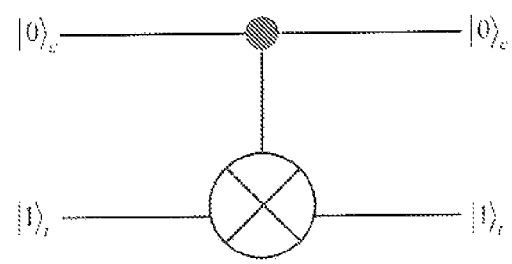
Figure 10C:
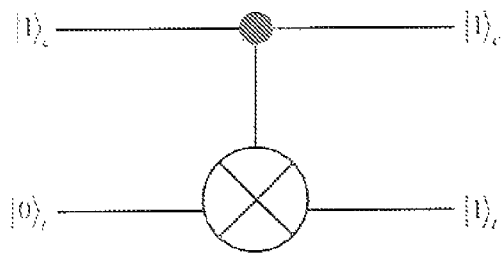
Figure 10D:
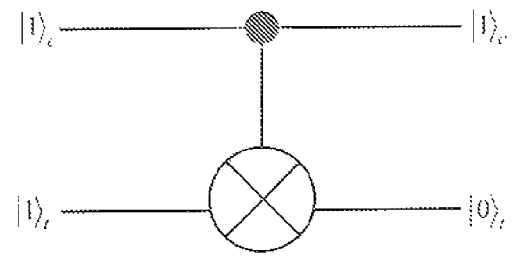

FIGS. 8E-8F illustrate a HWP 822 with a fast axis 824 at a 11.25° angle above the xz-plane. In FIG. 8E, the HWP 822 rotates the vertically polarized photon $|1\rangle$ 804 into photon in a polarization state 826, which is represented:

$$\hat{R}_{11.25}|1\rangle = -\sin\left(\frac{\pi}{8}\right)|0\rangle + \cos\left(\frac{\pi}{8}\right)|1\rangle$$

In FIG. 8F, the HWP 822 rotates the horizontally polarized photon $|0\rangle$ 810 into a polarization state 828, which is represented by:

$$\hat{R}_{11.25}|0\rangle = \cos\left(\frac{\pi}{8}\right)|0\rangle + \sin\left(\frac{\pi}{8}\right)|1\rangle$$

Positioning a second HWP with a corresponding negative fast axis value behind a first HWP with a positive same fast axis value reverses the rotation produced by the first HWP. For example, positioning a second HWP with a −45° fast axis angle after the HWP 800, shown in FIGS. 8A-8B, reverses the rotation produced by the HWP 800 as follows:

$$\hat{R}_{-45}|1\rangle = |0\rangle, \text{ and}$$

$$\hat{R}_{-45}|0\rangle = |1\rangle$$

Note that the operator $\hat{R}_{45}$ represents the same operation as the operator $\hat{R}_{-45}$. In other words, the operator $\hat{R}_{45}$ is its own inverse. Positioning a second HWP with a fast axis angle of −17.6° behind the HWP 814, shown in FIGS. 8C-8D, reverses the rotation produced by the HWP 814 as follows:

$$\hat{R}_{-17.6}\frac{1}{\sqrt{3}}(-|0\rangle + \sqrt{2}|1\rangle) = |1\rangle, \text{ and}$$

$$\hat{R}_{-17.6}\frac{1}{\sqrt{3}}(\sqrt{2}|0\rangle + |1\rangle) = |0\rangle$$

Positioning a second HWP with a fast axis angle of −11.25° behind the HWP 822, shown in FIGS. 8E-8F, reverses the rotation produced by the HWP 822 and is represented as follows:

$$\hat{R}_{-11.25}\left(-\sin\left(\frac{\pi}{8}\right)|0\rangle + \cos\left(\frac{\pi}{8}\right)|1\rangle\right) = |1\rangle, \text{ and}$$

$$\hat{R}_{-11.25}\left(\cos\left(\frac{\pi}{8}\right)|0\rangle + \sin\left(\frac{\pi}{8}\right)|1\rangle\right) = |0\rangle$$

FIGS. 9A-9C show circuit diagram representations of the HWPs corresponding to the operators $\hat{R}_{45}$, $\hat{R}_{17.6}$, $\hat{R}_{-17.6}$, $\hat{R}_{11.25}$, and $\hat{R}_{-11.25}$. Circuit diagrams are used below to illustrate implementation embodiments of the present invention. As shown in FIGS. 9A-9C, the HWPs are represented by boxes that are labeled with $R_\theta$ in order to identify the HWP fast axis angle, and horizontal lines represent transmission channels, such as optical fibers. In FIGS. 9A-9C, dashed-line directional arrows are used to show how the horizontally and vertically polarized states, represented by qubit-basis states $|0\rangle$ and $|1\rangle$, respectively, are input on the left-hand side of the HWPs, and the corresponding linear superposition of states are output on the right-hand side. FIG. 9A shows a HWP $R_{45}$ 902 that corresponds to the rotation represented by the operator $\hat{R}_{45}$. FIG. 9B shows a HWP $\hat{R}_{17.6}$ 904 that corresponds to the rotation represented by the operator $\hat{R}_{17.6}$ and a HWP $R_{-17.6}$ 906 that corresponds to the rotation represented by the operator $\hat{R}_{-17.6}$. FIG. 9C shows a HWP $R_{11.25}$ 908 that corresponds to the rotation represented by the operator $\hat{R}_{11.25}$ and a HWP $R_{-11.25}$ 910 that corresponds to the rotation represented by the operator $\hat{R}_{-11.25}$.

A controlled-NOT ("CNOT") gate is used in a number of implementation embodiments of the present invention. The CNOT gate includes two input qubits, one of which is called a "control" qubit and the other is called a "target" qubit. The action of the CNOT gate may be described as follows. When the control qubit is in the state $|0\rangle$, the state of the target qubit is unchanged. However, when the control qubit is in the state $|1\rangle$, the state of the target qubit is rotated of flipped. FIGS. 10A-10D show a quantum gate representation and operation of the CNOT gate for four different combinations of control and target qubit states. In FIGS. 10A-10D, the top transmission channel 1002 carries the control qubit, and the bottom transmission channel 1004 carries the target qubit. The subscript "c" on the states $|0\rangle_c$ and $|1\rangle_c$ identifies the control qubit, and the subscript "t" on the states $|0\rangle_t$ and $|1\rangle_t$ identifies the target qubit. FIGS. 10A-10D show the CNOT gate operations, which are also represented mathematically by the following rules:

$$\hat{C}_N|00\rangle = |00\rangle,$$

$$\hat{C}_N|01\rangle = |01\rangle,$$

$$\hat{C}_N|10\rangle = |11\rangle, \text{ and}$$

$$\hat{C}_N|11\rangle = |10\rangle,$$

respectively.

Note that in the quantum case, the CNOT gate operates on any input state in accordance with the above rules. For example, when the initial state is a product state given by:

$$\frac{1}{\sqrt{2}}(|0\rangle_c + |1\rangle_c)|0\rangle_t$$

an entangled state results as follows:

$$\hat{C}_N\left(\frac{1}{\sqrt{2}}(|0\rangle_c + |1\rangle_c)|0\rangle_t\right) = \frac{1}{\sqrt{2}}(\hat{C}_N|00\rangle + \hat{C}_N|10\rangle)$$

$$= \frac{1}{\sqrt{2}}(|00\rangle + |11\rangle)$$

Similarly, the CNOT gate may effect a disentangling operation.

Embodiments of the Present Invention

Various method and system embodiments of the present invention are directed to executing bit-commitment protocols that use entangled quantum states and a third party. For the sake of convenience, the method and system embodiments of the present invention are described below with reference to the mistrusting parties Alice and Bob and a third, independent party Trent. Alice, Bob, and Trent may each represent one of the following organizations: a person, a company, a corporation, a partnership, a firm, an enterprise, a government, a governmental subdivision, a governmental agency, and any other entity.

I. A First Bit-Commitment Protocol

Figure 11:
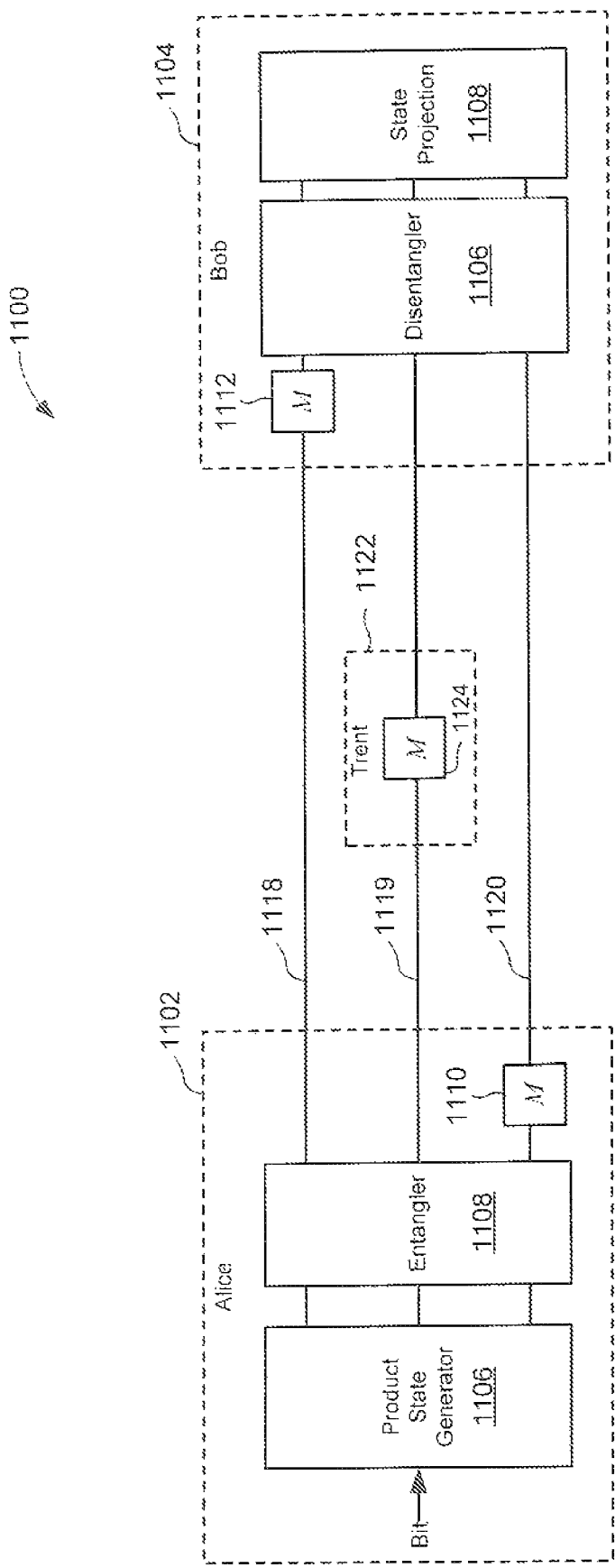
FIG. 11 illustrates a schematic representation of a first bit-commitment protocol that represents an embodiment of the present invention.

FIG. 11 illustrates a schematic representation of a first bit-commitment protocol 1100 for transmitting a bit from Alice 1102 to Bob 1104 that represents an embodiment of the present invention. As shown in FIG. 11, Alice 1102 controls a product state generator ("PSG") 1106, an entangler 1108, a first memory device 1110, and Bob 1104 controls a second memory device 1112, a disentangler 1114, and a state projector 1116. Alice uses the PSG 1106 to generate three qubits. All three qubits are either in a first qubit-basis state $|0\rangle$ or in a second qubit-basis state $|1\rangle$. The basis $\{|0\rangle|1\rangle\}$ can represent two coherent optical states, such as two orthogonal polarized electromagnetic waves (see e.g., W. J. Munro, et al., *New J. Phys.* 7, 137 (2005)), or static matter qubits (see e.g., T. P. Spiller, et al., *New J. Phys.* 8, 30 (2006)). Alice 1102 and Bob 1104 use three transmission channels 1118-1120 to separately transmit the three qubits. For example, the transmission channels 1118-1120 can be optical fibers. A third party Trent 1122 has access to the transmission channel 1119 and controls a third memory device 1124. The three memory devices 1110, 1112, and 1124 are used to store qubits transmitted in the transmission channels 1120, 1119, 1118, respectively.

The three qubits generated by the PSG 1106 may be represented by one of the following product states:

$|000\rangle = |0\rangle_1|0\rangle_2|0\rangle_3$, and $|111\rangle = |1\rangle_1|1\rangle_2|1\rangle_3$ where the subscripts "1," "2," and "3" correspond to the qubits transmitted in the transmission channels 1118-1120, respectively. The product states $|000\rangle$ and $|111\rangle$ are used by Alice and Bob to represent the bits "0" and "1." For purposes of describing the present invention, it is assumed that Alice and Bob have agreed that before any qubit is transmitted the qubit product state $|000\rangle$ represents the bit "0" and the qubit product state $|111\rangle$ represents the bit "1."

A. The Commitment Phase

To begin the commitment phase, Alice 1102 selects either the bit "0" or the bit to transmit to Bob 1104. When Alice selects the bit "0," Alice uses the PSG 1106 to generate three qubits in the product state $|000\rangle$. The qubit $|0\rangle_1$ is transmitted in the transmission channel 1118, the qubit $|0\rangle_2$ is transmitted in the transmission channel 1119, and the qubit $|0\rangle_3$ is transmitted in the transmission channel 1120. The entangler 1108 receives the product state $|000\rangle$ and may be used to generate a first tripartite entangled W-state:

$$|W_0\rangle = \frac{1}{\sqrt{3}}(|100\rangle + |010\rangle + |001\rangle)$$

Likewise, when Alice 1102 selects the bit "1" to transmit to Bob 1104, Alice 1102 also uses the PSG 1106 to generate qubits in the product state $|111\rangle$. The entangler 1108 receives the product state $|111\rangle$ and generates a second tri-partite entangled W-state:

$$|W_1\rangle = \frac{1}{\sqrt{3}}(|110\rangle + |101\rangle + |011\rangle)$$

In other words, after Alice 1102 has selected one of the bits "0" or "1" to transmit to Bob, Alice prepares a corresponding product state $|000\rangle$ or $|111\rangle$. Alice then transmits the product state to the entangler 1108 to prepare corresponding entangled tri-partite W-states $|W_0\rangle$ or $|W_1\rangle$, which represent the bits "0" and "1," respectively.

The operation performed by the entangler 1108 to produce the entangled W-states $|W_0\rangle$ or $|W_1\rangle$ can be represented mathematically by the W-operator:

$$\hat{W} = \frac{1}{\sqrt{3}}(\hat{X}_1\hat{Z}_2 + \hat{X}_2\hat{Z}_3 + \hat{Z}_1\hat{X}_3)$$

where $\hat{X}_m = |0\rangle_{mm}\langle 1| + |1\rangle_{mm}\langle 0|$, $\hat{Z}_m = |0\rangle_{mm}\langle 0| - |1\rangle_{mm}\langle 1|$, and m equals the subscripts 1, 2, and 3, which correspond respectively to the transmission channels 1118-1120.

The $\hat{X}_m$ operator operates on the qubits $|0\rangle_m$ and $|1\rangle_m$ as follows:

$\hat{X}_m|0\rangle_m = (|0\rangle_{mm}\langle 1| + |1\rangle_{mm}\langle 0|)|0\rangle_m$ $= |0\rangle_{mm}\langle 1|0\rangle_m + |1\rangle_{mm}\langle 0|0\rangle_m$, $= |1\rangle_m$ and likewise $\hat{X}_m|1\rangle_m = |0\rangle_m$ The $\hat{Z}_m$ operator operates on the qubits $|0\rangle_m$ and $|1\rangle_n$ as follows:

$$\hat{Z}_m|0\rangle_m = (|0\rangle_{mm}\langle 0|-|1\rangle_{mm}\langle 0|)|0\rangle_m$$
$$= |0\rangle_{mm}\langle 0|0\rangle_m - |1\rangle_{mm}\langle 1|0\rangle_m,$$
$$= |0\rangle_m$$

and likewise $$\hat{Z}_m|1\rangle_m = -|1\rangle_m$$

The three operator terms $\hat{X}_1\hat{Z}_2$, $\hat{X}_2\hat{Z}_3$, and $\hat{Z}_1\hat{X}_3$ represent operations that are carried out in parallel on three different combination pairs of the three qubits.

Figure 12A:
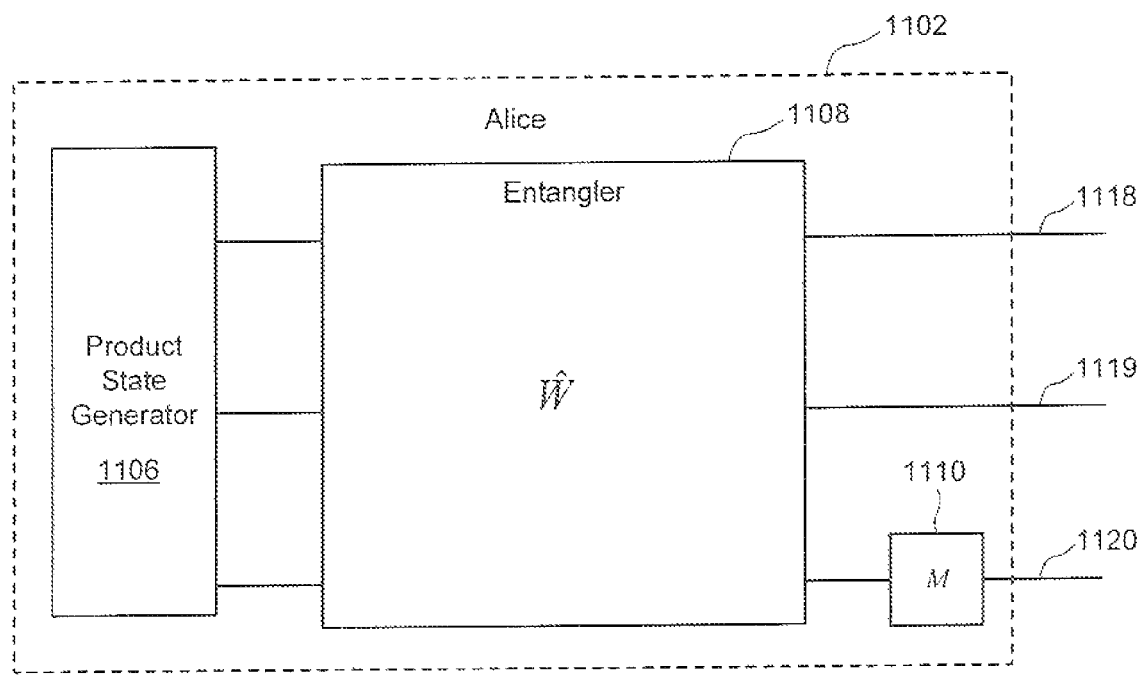
FIGS. 12A-12B illustrates an inverse relationship between an entangler and disentangler that represents an embodiment of the present invention.

FIG. 12A illustrates a schematic representation of the entanglement operation performed by the entangler 1108 in accordance with the W-operator that represents an embodiment of the present invention. The operation performed by the entangler 1108 on the product state $|000\rangle$ is mathematically represented by:

$$\hat{W}|000\rangle = \frac{1}{\sqrt{3}}(\hat{X}_1\hat{Z}_2 + \hat{X}_2\hat{Z}_3 + \hat{Z}_1\hat{X}_3)|000\rangle$$
$$= \frac{1}{\sqrt{3}}(\hat{X}_1\hat{Z}_2|000\rangle + \hat{X}_2\hat{Z}_3|000\rangle + \hat{Z}_1\hat{X}_3|000\rangle)$$
$$= \frac{1}{\sqrt{3}}(\hat{X}_1|0\rangle_1\hat{Z}_2|0\rangle_2|0\rangle_3 + |0\rangle_1\hat{X}_2|0\rangle_2\hat{Z}_3|0\rangle_3 +$$
$$\hat{Z}_1|0\rangle_1|0\rangle_2\hat{X}_3|0\rangle_3)$$
$$= \frac{1}{\sqrt{3}}(|100\rangle + |010\rangle + |001\rangle)$$
$$= |W_0\rangle$$

Likewise, the operation performed by the W-operator on the product state $|111\rangle$ gives:

$$\hat{W}|111\rangle = \frac{1}{\sqrt{3}}(|110\rangle + |101\rangle + |011\rangle) = |W_1\rangle$$

Referring again to FIG. 11, Alice 1102 controls all three qubits that, depending on the choice of bit she decides to send to Bob 1104, are entangled in either the W-state $|W_0\rangle$ or in the W-state $|W_1\rangle$. Alice 1102 completes the commitment phase by transmitting the first qubit to Bob 1104 and the second qubit to Trent 1122. Bob 1104 stores the first qubit in the storage device 1112, and Trent 1122 stores the second qubit in the storage device 1124. Meanwhile, Alice 1102 stores the third qubit in the storage device 1110.

B. The Reveal Phase

When Alice is ready to reveal to Bob the bit she selected, Alice instructs Trent to transmit the second qubit to Bob and Alice transmits the third qubit to Bob. At this point, Bob controls all three qubits, which, from Bob's point of view, have equal probability of being in either the W-state $|W_0\rangle$ or the W-state $|W_1\rangle$. Bob may disentangle all three qubits by transmitting all three qubits to the disentangler 1114, which performs an inverse operation on the entangled W-states $|W_0\rangle$ and $|W_1\rangle$ and can be mathematically represented as follows:

$$\hat{W}^{-1}|W_0\rangle = |000\rangle, \text{ and}$$

$$\hat{W}^{-1}|W_1\rangle = |111\rangle$$

Figure 12B:
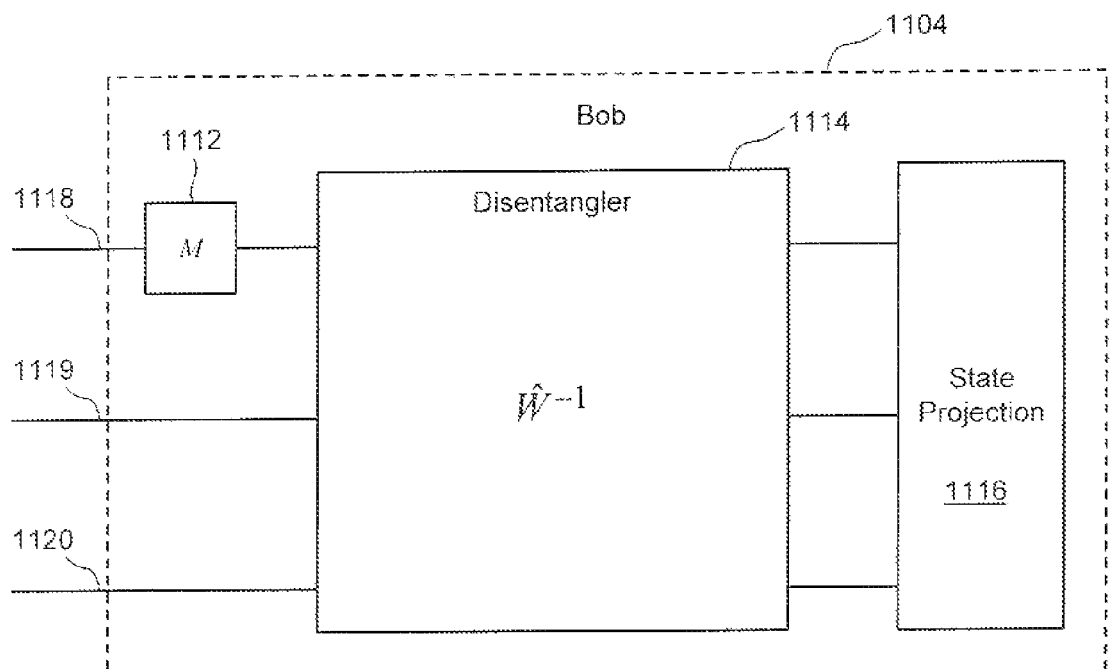

FIG. 12B illustrates a schematic representation of the disentanglement operation performed by the disentangler 1114 in accordance with the $W^{-1}$-operator that represents an embodiment of the present invention. Note that the operator W also gives:

$$\hat{W}|W_0\rangle = |000\rangle \text{ and}$$

$$\hat{W}|W_1\rangle = |111\rangle$$

In other words, $$\hat{W}^{-1}(\hat{W}|W_0\rangle) = |W_0\rangle = \hat{W}(\hat{W}|W_0\rangle)$$

and, therefore, $\hat{W}$ equals $\hat{W}^{-1}$.

Bob then uses the state projection 1116 to perform a state projection measurement on all three of the qubits in the $\{|0\rangle, |1\rangle\}$ basis. When the outcome of the state projection measurement is the product state $|000\rangle$, Bob knows that Alice committed the bit "0," and when the outcome of the state projection measurement is the product state $|111\rangle$, Bob knows that Alice committed the bit "1."

II. A Second Bit Commitment Protocol

Figure 13:
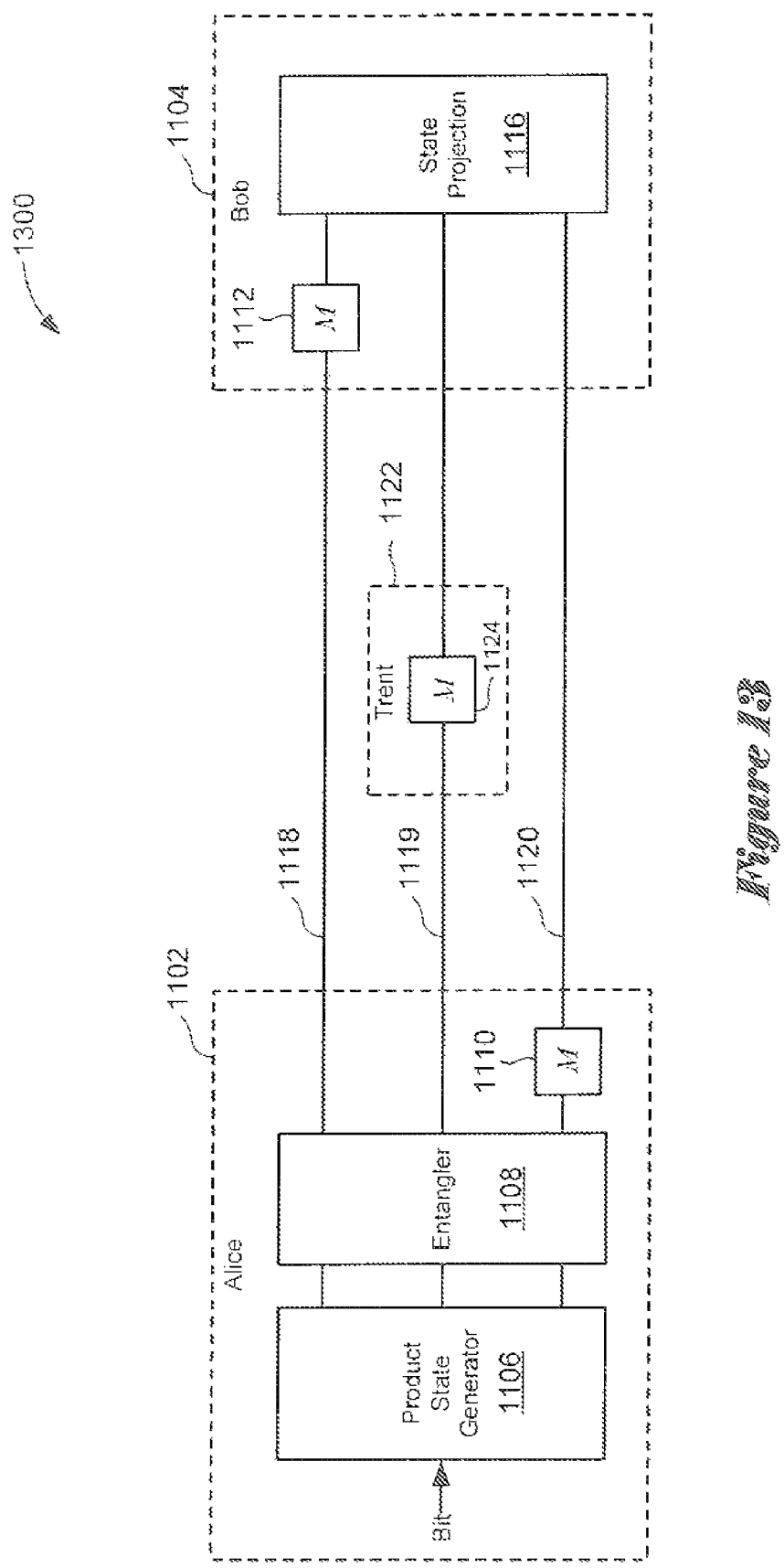
FIG. 13 illustrates a schematic representation of a second bit-commitment protocol that represents an embodiment of the present invention.

FIG. 13 illustrates a schematic representation of a second bit-commitment protocol 1300 for transmitting a bit from Alice 1102 to Bob 1104 that represents an embodiment of the present invention. As shown in FIG. 13, the components of the second bit-commitment protocol 1300 are identical to the first bit-commitment protocol 1100 except the disentangler 1114, shown in FIG. 11, has been eliminated. Therefore, in the interest of brevity, components of the second bit-commitment protocol 1300, that are identical to the components of the first bit-commitment protocol 1100, shown in FIG. 11, have been provided with the same reference numerals and an explanation of their structure and function is not repeated. For the second bit-commitment protocol 1300, the commitment phase carried out by Alice 1102 is unchanged. However, the reveal phase carried out by Bob 1104 is different. As described above with reference to the first bit-commitment protocol 1100, when Alice 1102 is ready to reveal the bit to Bob 1104, Bob 1104 still receives the three qubits that from his point of view are entangled in either the W-state $|W_0\rangle$ of the W-state $|W_1\rangle$, which correspond respectively to the bits "0" and "1." However, rather than disentangling, Bob can transmit the three qubits to state projection 1116 and perform qubit measures to determine the state of the three qubits.

Based on the equation representing the W-state $|W_0\rangle$, when Alice transmits the three qubits in the state $|W_0\rangle$, the state projection 1116 projects the three qubits with equal probability (⅓) into one of the three states $|100\rangle$, $|010\rangle$, and $|001\rangle$. Based on the equation representing the W-state $|W_1\rangle$, when Alice transmits the three qubits in the state $|W_1\rangle$, the state projection 1116 projects the three qubits with equal probability (⅓) into one of the three states $|110\rangle$, $|101\rangle$, and $|011\rangle$. As a result, Bob knows that when the state projection 1116 measurements reveal any two of the three qubits in the state $|0\rangle$, Alice transmitted the entangled state $|W_0\rangle$ and that she committed the bit "0." Bob also knows that when the state projection 1116 measurements reveal any two of the three qubits in the state $|1\rangle$, Bob knows that Alice transmitted the entangled state $|W_1\rangle$ and that she committed the bit "1."

Note that although the first and second bit-commitment protocols 1100 and 1300 have been described above for W-states comprising linear superpositions of states all with a phase exp(i2πn)=1, where n is an even integer, in alternate embodiments of the present invention, any entangler 1102 can be used that produces W-states in the general form:

$$|W_0\rangle = \frac{1}{\sqrt{3}}(e^{i\phi_1}|100\rangle + e^{i\phi_2}|010\rangle + e^{i\phi_3}|001\rangle), \text{ and}$$

$$|W_1\rangle = \frac{1}{\sqrt{3}}(e^{i\theta_1}|110\rangle + e^{i\theta_2}|101\rangle + e^{i\theta_3}|011\rangle)$$

where the phase angles $\phi_1$, $\phi_2$, $\phi_3$, $\theta_1$, $\theta_2$, and $\theta_3$ are integer multiples of ir.

III. Cheating

After Alice has committed the bit, she cannot cheat and change the value of the bit, because Alice would have to perform a three qubit operation that allows her access to the qubits stored in the storage devices 1112 and 1124. Alice cannot cheat by conspiring with Trent, because changing the state $|W_0\rangle$ to the state $|W_1\rangle$ or changing the state $|W_1\rangle$ to the state $|W_0\rangle$ cannot be accomplished without access to Bob's qubit. Note also that in order to prevent Alice from cheating, Bob needs to measure all three qubits, because it might be possible for Alice to submit some other input state and then cheat by changing her qubit state just before the reveal stage.

On the other hand, Bob cannot learn the value of the bit with certainty. Bob has a ½ chance of just guessing the bit without attempting to gather additional information. However, Bob may increase his chances of correctly guessing the committed bit by measuring the qubit under his control. For example, when Bob measures the qubit under his control and obtains the state $|0\rangle$, Bob should guess that this outcome came from the qubit being in the W-state $|W_0\rangle$, because the probability that the state $|0\rangle$ was entangled in the W-state $|W_0\rangle$ is ⅔, and the probability that the state $|0\rangle$ was entangled in the W-state $|W_1\rangle$ is ⅓. Guessing in this manner is correct about ⅔ of the time and wrong about ⅓ of the time.

Bob may also try to increase his chances of correctly guessing the committed bit by conspiring with Trent or coercing Trent into also measuring the qubit under Trent's control. The possible measurement results are $|10\rangle$, $|01\rangle$, $|00\rangle$, and $|11\rangle$. Based on the linear superpositions for $|W_0\rangle$ and $|W_1\rangle$, Bob and Trent can expect to observe their qubits in the states $|10\rangle$ or $|01\rangle$ about ⅔ of the time and the states $|00\rangle$ and $|11\rangle$ about ⅓ of the time. When the outcome of their measurements give the state $|10\rangle$ or the state $|01\rangle$, Bob and Trent have no way of knowing whether the measurement results came from qubits in the state $|W_0\rangle$ or the state $|W_1\rangle$ because the states $|10\rangle$ and $|01\rangle$ occur with equal probability in the states $|W_0\rangle$ and $|W_1\rangle$. As a result, when Bob and Trent observe either the state $|10\rangle$ or the state $|01\rangle$, Bob and Trent will have to guess and can only expect to be correct about ½ of the time. Now when the measurements result in $|00\rangle$, Bob and Trent know with certainty that this result came from their qubits being entangled in the state $|W_0\rangle$, or when the measurement result is $|11\rangle$, Bob and Trent also know with certainty that this result came from their qubits being entangled in the state $|W_1\rangle$. However, as mentioned above, Bob and Trent may only obtain the measurement results $|00\rangle$ and $|11\rangle$ about ⅓ of the time, and about ⅔ of the time, Bob and Trent can expect to get no definitive answer and will have to guess. As a result, when Bob and Trent are conspiring to cheat by performing measurements, they can expect to get the correct bit about ⅔ (=⅓+(½)(⅔)) of the time. So there is no increase in cheating probability for Bob by conspiring with Trent. However, ⅓ of the time the measurement performed by Trent and Bob can herald the correct answer with certainty, whereas this is not so if Bob does not conspire with Trent.

IV. Implementation

Figure 14:
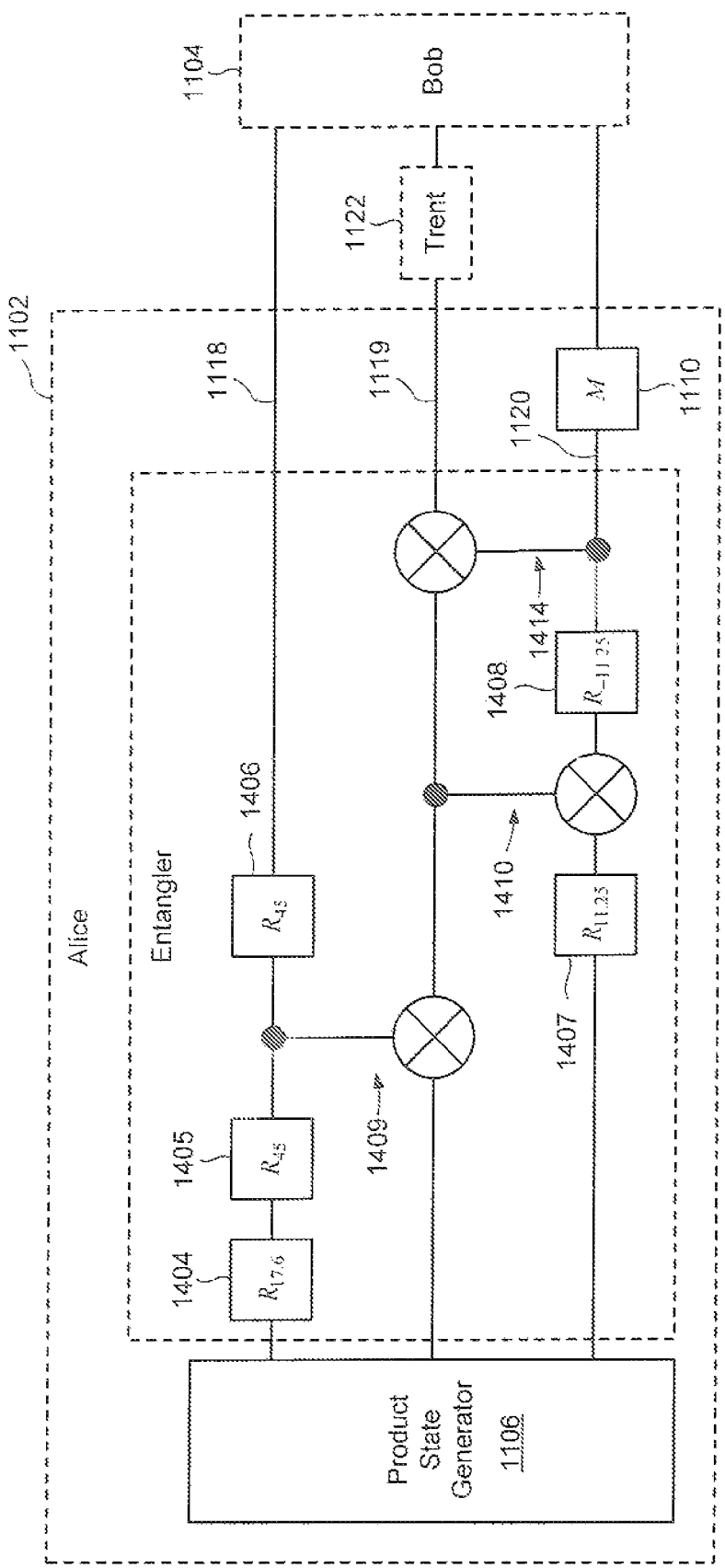
FIG. 14 illustrates a circuit diagram implementation of an entangler that represents an embodiment of the present invention.

The following discussion is directed to system embodiments that can be used to implement the entangler 1108 and the disentangler 1114 described above with reference to FIGS. 11-12. FIG. 14 illustrates a circuit diagram implementation of an entangler 1402 that Alice 1102 may use to generate the W-states $|W_0\rangle$ and $|W_1\rangle$ that represents an implementation embodiment of the present invention. The entangler 1402 comprises a HWP $R_{17.6}$ 1404, two HWPs $R_{45}$ 1405 and 1406, a HWP $R_{11.25}$ 1407, a HWP $R_{-11.25}$ 1408, and three CNOT gates 1409-1411. The HWPs 1404-1406 are coupled to the transmission channel 1118, and the HWPs 1407 and 1408 are coupled to the transmission channel 1120. Operation of the individual HWPs 1404-1408 is described above with reference to FIGS. 8-9. The CNOT gate 1409 rotates the state of the qubit transmitted in the transmission channel 1119 based on the state of the qubit transmitted in the transmission channel 1118, the CNOT gate 1410 rotates the state of the qubit transmitted in the transmission channel 1120 based on the state of the qubit transmitted in the transmission channel 1119, and the CNOT gate 1414 rotates the state of the qubit transmitted in the transmission channel 1119 based on the state of the qubit transmitted in the transmission channel 1120. Operation of the CNOT gates 1409-1411 is described above with reference to FIG. 10. The CNOT gates 1409-1411 can be realized using a number of well-known CNOT gate implementations. For example, a linear optics quantum computation ("LOQC") described by O'Brien et al. *Nature* 426, 264 (2003) and a single photon two-qubit logic ("SPTQ") described by Fiorentino et al., *Phys. Rev. Lett.*, 93 070502 (2005) can both be used to implement the CNOT gates 1409-1411.

The PSG 1106 can be a laser diode that generates polarized photons which are represented by qubit-basis states $|0\rangle$ and $|1\rangle$. The qubit-basis states $|0\rangle$ and $|1\rangle$ may represent vertically and horizontally polarized photons, or, in alternate embodiments of the present invention, the qubit-basis states $|0\rangle$ and $|1\rangle$ can represent horizontally and vertically polarized photons, respectively.

The following is a mathematical representation of how the HWPs 1404-1408 and the CNOT gates 1409-1411 comprising the entangler 1402 transform polarized photons in the product state $|000\rangle$ into the W-state $|W_0\rangle$ in terms of the HWP and CNOT gate operators described above with reference to FIGS. 8-10. Suppose that Alice decides to commit the bit "0" and use the PSG 1106 to generate three separate photons. All three of the photons are in the same polarization state, which can be represented individually by the qubit-basis states $|0\rangle_1$, $|0\rangle_2$, and $|0\rangle_3$ and can also be represented by the product state $|000\rangle$ as described above. The individual photons $|0\rangle_1$, $|0\rangle_2$, and $|0\rangle_3$ are transmitted in the transmission channels 1118-1120, respectively, to the entangler 1102.

As the three photons propagate through the entangler 1402, the HWP $R_{17.6}$ 1404 rotates the polarization state of the first photon to give the state:

$$(\hat{R}_{17.6}|0\rangle_1)|00\rangle = \sqrt{\frac{2}{3}}|000\rangle + \frac{1}{\sqrt{3}}|100\rangle$$

Next, the operation performed by the HWP $R_{45}$ 1405 rotates the polarization state of the first photon to give:

$$\sqrt{\frac{2}{3}}(\hat{R}_{45}|0\rangle_1)|00\rangle + \frac{1}{\sqrt{3}}(\hat{R}_{45}|1\rangle_1)|00\rangle = \sqrt{\frac{2}{3}}|100\rangle + \frac{1}{\sqrt{3}}|000\rangle$$

The operation performed by the CNOT gate 1409 rotates the polarization state of the second photon, based on whether or not the first photon is in the polarization state $|1\rangle_1$, as follows:

$$\sqrt{\frac{2}{3}}(\hat{C}_N|10\rangle)|0\rangle_3 + \frac{1}{\sqrt{3}}(\hat{C}_N|00\rangle)|0\rangle_3 = \sqrt{\frac{2}{3}}|110\rangle + \frac{1}{\sqrt{3}}|000\rangle$$

The rotation operations performed by the HWPs $R_{45}$ 1406 and $R_{11.25}$ 1407 on the first and third photons is represented by:

$$\sqrt{\frac{2}{3}}(R_{45}|1\rangle_1)|1\rangle_2(R_{11.25}|0\rangle) + \frac{1}{\sqrt{3}}(R_{45}|0\rangle_1)|0\rangle_2(R_{11.25}|0\rangle),$$

which, after simplifying, places the three photons in a state represented by:

$$\sqrt{\frac{2}{3}}\left(\cos\left(\frac{\pi}{8}\right)|010\rangle + \sin\left(\frac{\pi}{8}\right)|011\rangle\right) + \sqrt{\frac{1}{3}}\left(\cos\left(\frac{\pi}{8}\right)|100\rangle + \sin\left(\frac{\pi}{8}\right)|101\rangle\right)$$

The operation performed by the CNOT gate 1410 rotates the polarization state of the third photon, based on whether or not the second photon is in the polarization state $|1\rangle_2$, as follows:

$$\sqrt{\frac{2}{3}}\left(\cos\left(\frac{\pi}{8}\right)|0\rangle_1(\hat{C}_N|10\rangle) + \sin\left(\frac{\pi}{8}\right)|0\rangle_1(\hat{C}_N|11\rangle)\right) + $$
$$\sqrt{\frac{1}{3}}\left(\cos\left(\frac{\pi}{8}\right)|1\rangle_1(\hat{C}_N|00\rangle) + \sin\left(\frac{\pi}{8}\right)|1\rangle_1(\hat{C}_N|01\rangle)\right)$$

which gives the three photons in the state:

$$\sqrt{\frac{2}{3}}\left(\cos\left(\frac{\pi}{8}\right)|011\rangle + \sin\left(\frac{\pi}{8}\right)|010\rangle\right) + \sqrt{\frac{1}{3}}\left(\cos\left(\frac{\pi}{8}\right)|100\rangle + \sin\left(\frac{\pi}{8}\right)|101\rangle\right)$$

The operation performed by the HWP $R_{11.25}$ 1408 on the third photon is represented by:

$$\sqrt{\frac{2}{3}}\left(\cos\left(\frac{\pi}{8}\right)|01\rangle(R_{-11.25}|1\rangle_3) + \sin\left(\frac{\pi}{8}\right)|01\rangle(R_{-11.25}|0\rangle_3)\right) + $$
$$\sqrt{\frac{1}{3}}\left(\cos\left(\frac{\pi}{8}\right)|10\rangle(R_{-11.25}|0\rangle_3) + \sin\left(\frac{\pi}{8}\right)|10\rangle(R_{-11.25}|1\rangle_3)\right)$$

which, after simplifying, heralds the three photons in an entangled state:

$$\frac{1}{\sqrt{3}}(|100\rangle + |010\rangle + |011\rangle)$$

Finally, the operation performed by the CNOT gate 1414 rotates the polarization state of the second photon, based on whether or not the third photon is in the polarization state $|1\rangle_3$, as follows:

$$\frac{1}{\sqrt{3}}\left(|1\rangle_1(\hat{C}_N|00\rangle) + |0\rangle_1(\hat{C}_N|10\rangle) + |0\rangle_1(\hat{C}_N|11\rangle)\right) = $$
$$\frac{1}{\sqrt{3}}(|100\rangle + |010\rangle + |001\rangle) = |W_0\rangle$$

The three photons are then output from the entangler 1402 in the entangled W-state $|W_0\rangle$. Alice completes the commitment phase by transmitting the first photon to Bob 1104 and the second photon to Trent 1122, who store their respective photons in the memory devices 1112 and 1124, respectively. Alice stores the third photon in the memory device 1110. The memory devices 1110, 1112, and 1124 may include fiber loops or atomic nuclear spin states to store the respective polarization states.

When Alice decides to commit the bit "1," Alice uses the PSG 1106 to generate three separate photons, all of which are in the same polarization state and are represented by the qubit-basis states $|1\rangle_1$, $|1\rangle_2$, and $|1\rangle_3$ and can also be represented by the product state $|111\rangle$. The individual qubits $|1\rangle_1$, $|1\rangle_2$, and $|1\rangle_3$ are transmitted in the transmission channels 1118-1120, respectively, to the entangler 1402. In the interest of brevity, a mathematical description of transforming the product state $|111\rangle$ into the W-state $|W_1\rangle$ is not included because the transformation is similar to the transformation described for obtaining the W-state $|W_0\rangle$ from the product state $|000\rangle$.

Figure 15:
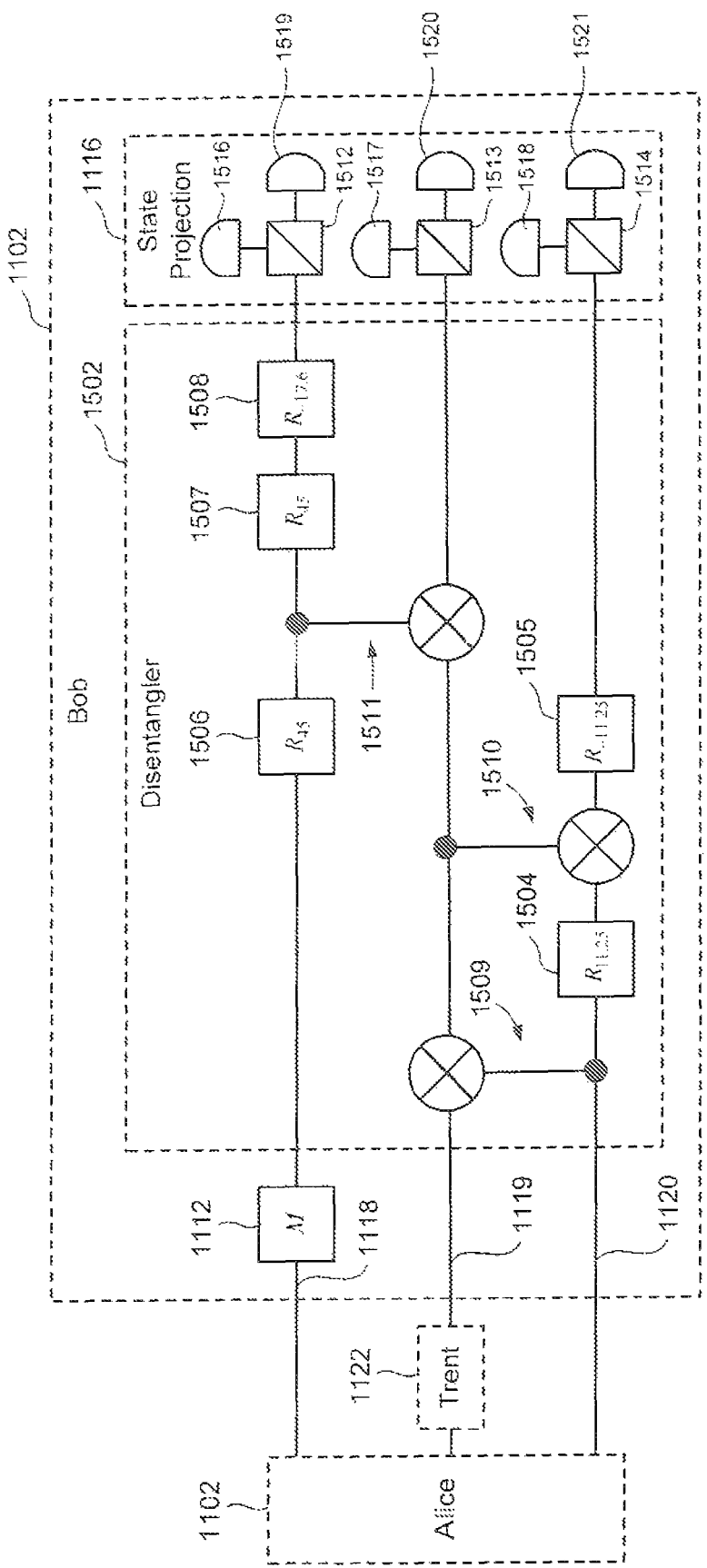
FIG. 15 illustrates a circuit diagram implementation of a disentangler that represents an embodiment of the present invention.

FIG. 15 illustrates a circuit diagram implementation of a disentangler 1502 used by Bob 1104 to generate the product states $|000\rangle$ and $|111\rangle$ from the corresponding W-states $|W_0\rangle$ and $|W_1\rangle$ that represents an implementation embodiment of the present invention. The disentangler 1502 comprises a HWP $R_{11.25}$ 1504, a HWP $R_{-11.25}$ 1505, two HWPs $R_{45}$ 1506 and 1507, a HWP $R_{-17.6}$ 1508, and three CNOT gates 1509-1511. The HWPs 1506-1508 are coupled to the transmission channel 1118, and the HWPs 1504 and 1505 are coupled to the transmission channel 1120. Operation of the individual HWPs 1504-1508 is described above with reference to FIGS. 8-9. The CNOT gate 1509 rotates the state of the qubit transmitted in the transmission channel 1119 based on the state of the qubit transmitted in the transmission channel 1120, the CNOT gate 1510 rotates the state of the qubit transmitted in the transmission channel 1120 based on the state of the qubit transmitted in the transmission channel 1119, and the CNOT gate 1511 rotates the state of the qubit transmitted in the transmission channel 1119 based on the state of the qubit transmitted in the transmission channel 1118. Operation of the CNOT gates 1509-1511 is described above with reference to FIG. 10. The CNOT gates 1509-1511 can be realized using a number of well-known CNOT gate implementations, as described in the above cited references by O'Brien and Fiorentino.

Also shown in FIG. 15 is a circuit diagram representation of the state projection 1116 that represents an embodiment of the present invention. The state projection 1116 comprises three polarizing beamsplitters 1512-1514 and six photodetectors 1516-1521. Each of the polarizing beamsplitters 1512-1514 is coupled to two of the six photodetectors 1516-1521. The polarizing beamsplitters 1512-1514 reflect vertically polarized photons to the three photodetectors 1516-1518, respectively, and transmit horizontally polarized photons to the three photodetectors 1519-1521, respectively. The photodetectors 1516-1521 can be photodetectors, p-i-n photodiodes, single photon counting modules, such as an avalanche photodiode, or any other photodetector that is well-known in the art.

The following is a mathematical representation of how the HWPs 1504-1508 and the CNOT gates 1509-1511 comprising the disentangler 1502 transform polarized photons in the W-state $|W_0\rangle$ back into the product state $|000\rangle$ using the HWP and CNOT gate operators described above with reference to FIGS. 8-10. The three photons enter the disentangler 1502 in the W-state $|W_0\rangle$. The operation performed by the CNOT gate 1504 rotates the polarization state of the second photon, based on whether or not the third photon is in the polarization state $|1\rangle_3$, as follows:

$$\frac{1}{\sqrt{3}}\left(|1\rangle \hat{C}_N|00\rangle + |0\rangle \hat{C}_N|10\rangle + |0\rangle \hat{C}_N|01\rangle\right) = \frac{1}{\sqrt{3}}\left(|100\rangle + |010\rangle + |011\rangle\right)$$

The HWP $R_{11.25}$ 1504 rotates the polarization state of the third photon to give the state:

$$\frac{1}{\sqrt{3}}\left(|10\rangle \hat{R}_{11.25}|0\rangle_3 + |01\rangle \hat{R}_{11.15}|0\rangle_3 + |01\rangle \hat{R}_{11.15}|1\rangle_3\right) =$$

$$\frac{1}{\sqrt{3}}\left(\sin\left(\frac{\pi}{8}\right)|101\rangle + \cos\left(\frac{\pi}{8}\right)|100\rangle + \right.$$

$$\left(\sin\left(\frac{\pi}{8}\right) + \cos\left(\frac{\pi}{8}\right)\right)|011\rangle + \left(\cos\left(\frac{\pi}{8}\right) - \sin\left(\frac{\pi}{8}\right)\right)|010\rangle\right)$$

The operation performed by the CNOT gate 1510 rotates the polarization state of the third photon, based on whether or not the second photon is in the polarization state $|1\rangle_2$, as follows:

$$\frac{1}{\sqrt{3}}\left(\sin\left(\frac{\pi}{8}\right)|1\rangle_1 \hat{C}_N|01\rangle + \cos\left(\frac{\pi}{8}\right)|1\rangle_1 \hat{C}_N|00\rangle + \right.$$

$$\left(\sin\left(\frac{\pi}{8}\right) + \cos\left(\frac{\pi}{8}\right)\right)|0\rangle_1 \hat{C}_N|11\rangle + \left(\cos\left(\frac{\pi}{8}\right) - \sin\left(\frac{\pi}{8}\right)\right)|0\rangle_1 \hat{C}_N|10\rangle\right) =$$

$$\frac{1}{\sqrt{3}}\left(\sin\left(\frac{\pi}{8}\right)|101\rangle + \cos\left(\frac{\pi}{8}\right)|100\rangle + \left(\sin\left(\frac{\pi}{8}\right) + \cos\left(\frac{\pi}{8}\right)\right)|010\rangle + \right.$$

$$\left.\left(\cos\left(\frac{\pi}{8}\right) - \sin\left(\frac{\pi}{8}\right)\right)|011\rangle\right)$$

The rotation operations performed by the HWPs $R_{45}$ 1506 and $R_{-11.25}$ 1505 on the first and third photons is represented by:

$$\frac{1}{\sqrt{3}}\left(\sin\left(\frac{\pi}{8}\right)(\hat{R}_{45}|1\rangle_1)|0\rangle_2(\hat{R}_{-11.25}|1\rangle_3) + \cos\left(\frac{\pi}{8}\right)(\hat{R}_{45}|1\rangle_1)|0\rangle_2(\hat{R}_{-11.25}|0\rangle_3) + \right.$$

$$\left(\sin\left(\frac{\pi}{8}\right) + \cos\left(\frac{\pi}{8}\right)\right)(\hat{R}_{45}|0\rangle_1)|1\rangle_2(\hat{R}_{-11.25}|0\rangle_3) +$$

$$\left.\left(\cos\left(\frac{\pi}{8}\right) - \sin\left(\frac{\pi}{8}\right)\right)(\hat{R}_{45}|0\rangle_1)|1\rangle_2(\hat{R}_{-11.25}|1\rangle_3)\right)$$

which, after simplifying, places the three photons in a state represented by:

$$\frac{1}{\sqrt{3}}\left(\sqrt{2}|110\rangle + |000\rangle\right)$$

The operation performed by the CNOT gate 1511 rotates the polarization state of the second photon, based on whether or not the first photon is in the polarization state $|1\rangle_1$, as follows:

$$\frac{1}{\sqrt{3}}\left(\sqrt{2}\,\hat{C}_N|11\rangle|0\rangle_3 + \hat{C}_N|00\rangle|0\rangle_3\right) = \frac{1}{\sqrt{3}}\left(\sqrt{2}|100\rangle + |000\rangle\right)$$

The rotation operation performed by the HWP $R_{45}$ 1507 on the first photon is represented by:

$$\frac{1}{\sqrt{3}}\left(\sqrt{2}\,\hat{R}_{45}|1\rangle_1|00\rangle + \hat{R}_{45}|0\rangle_1|00\rangle\right) = \frac{1}{\sqrt{3}}\left(\sqrt{2}|000\rangle + |100\rangle\right)$$

The rotation operation performed by the HWP R−17.6 1508 gives after simplifying the original product state generated by Alice 1102 as follows:

$$\frac{1}{\sqrt{3}}\left(\sqrt{2}\,\hat{R}_{-17.6}|0\rangle_1|00\rangle + \hat{R}_{-17.6}|1\rangle_1|00\rangle\right) = |000\rangle$$

When Alice commits the bit "1," the entangler 1402 generates a W-state $|W_1\rangle$, as described above. The disentangler 1502 disentangles the three photons in the entangled state $|W_1\rangle$ and gives the three photons in the product state $|111\rangle$. In the interest of brevity, a mathematical representation of transforming the W-state $|W\rangle$ into the product state $|111\rangle$ is not included because the transformation is similar to obtaining the product state $|000\rangle$ from the W-state $|W_0\rangle$ described above. In either case, the three photons are then output from the disentangler 1502 to the state projector 1116, where, depending on the polarization states of the three photons, either all three photodetectors 1516-1518 record detecting the three photons, or all three of the photodetectors 1519-1521 record detecting the three photons. For example, when the product state $|000\rangle$ represents three horizontally polarized photons, all three photons are transmitted to the photodetectors 1519-1521, or when the product state $|000\rangle$ represents three vertically polarized photons, all three photons are reflected to the photodetectors 1516-1518.

Although the present invention has been described in terms of particular embodiments, it is not intended that the invention be limited to these embodiments. Modifications within the spirit of the invention will be apparent to those skilled in the art. For example, although preparation of the states $|W_0\rangle$ and $|W_1\rangle$ can be represented as the action of W-operator $\hat{W}$ on the product states, as described above with reference to FIGS. 11-12, the bit-commitment protocol does not depend on the W-operator $\hat{W}$. In the implementation subsection above, the entangler 1402 and the disentangler 1502 circuit diagrams break down the preparation into a number of well-known quantum computing gates. In alternate embodiments of the present invention, Alice 1102 may use a heralded, but probabilistic, entangler to generate the states $|W_0\rangle$ and $|W_1\rangle$. In alternate embodiments of the present invention, any combination of quantum gates in the entangler 1102 can be used, which produce W-states in the general form:

$$|W_0\rangle = \frac{1}{\sqrt{3}}(e^{i\phi_1}|100\rangle + e^{i\phi_2}|010\rangle + e^{i\phi_3}|001\rangle), \text{ and}$$

$$|W_1\rangle = \frac{1}{\sqrt{3}}(e^{i\theta_1}|110\rangle + e^{i\theta_2}|101\rangle + e^{i\theta_3}|011\rangle)$$

where the phase angles $\phi_1$, $\phi_2$, $\phi_3$, $\theta_1$, $\theta_2$, and $\theta_3$ are integer multiples of $\pi$. Alice may also select the appropriate heralded state to commit the bit "0" or "1." Note that as described above with reference to the second bit-commitment protocol, shown in FIG. 13, in alternate embodiments of the present invention, Bob 1104 may decided not to include the disentangler 1502. Bob can instead proceed with performing state projection measurements on the three qubits using the state projection device 1116, shown in FIG. 15. In alternate embodiments of the present invention, Bob can use a disentangler comprising any combination of quantum gates that achieves the desired disentangling operation before performing a measurement. However, Bob should not use a probabilistic (irreversible) disentangling operation, because he cannot guarantee that he will obtain the value of the committed bit. In an alternate embodiment of the present invention, it would be obvious to those skilled in the art to modify the system and method embodiments of the present invention so that each bit in a bit string can be operated on in accordance with the method and system embodiments of the present invention. In alternate embodiments of the present invention, the method and system embodiments of the present invention can be modified to enable Alice and Bob to exchange information rather than to send information one way. For example, Alice may have in addition to the PSG 1106, entangler 1108, and memory device 1110, a disentangler and a state projection device. Bob may have in addition to a disentangler 1114 and a state projection device 1116, a PSG and an entangler. In alternate embodiments of the present invention, Alice and Bob may agree that the qubit product states $|000\rangle$ and $|111\rangle$ represent the bits "1" and "0," respectively.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for executing a bit-commitment protocol for transmitting a bit from a first party to a second party, the method comprising:

preparing three qubits in one of two entangled W-states, wherein a first W-state represents one bit value and a second W-state represents a second bit value, two of the three qubits are in a first qubit-basis state, and one of the three qubits is in a second qubit-basis state, wherein the first and second qubit-basis states are two orthogonal polarization states of electromagnetic waves or two atomic nuclear spin states;

storing a first qubit of the three qubits in a first storage device controlled by the first party, a second qubit of the three qubits in a second storage device controlled by the second party, and the third qubit of the three qubits in a third storage device controlled by a third party;

transmitting the first qubit and the third qubit to the second party; and revealing the bit to the second party by measuring the state qubits to determine which of the two W-states the three qubits are in.

2. The method of claim 1 wherein preparing the three qubits further comprising preparing the three qubits in one of the following two product states:

$|000\rangle$, and $|111\rangle$ where $|0\rangle$ and $|1\rangle$ represent qubit-basis states.

3. The method of claim 1 wherein preparing three qubits in one of two entangled W-states further comprises performing an operation on the three qubits, which can be mathematically represented by:

$$\hat{W} = \frac{1}{\sqrt{3}}(\hat{X}_1\hat{Z}_2 + \hat{X}_2\hat{Z}_3 + \hat{Z}_1\hat{X}_3)$$

where $\hat{X}_m = |0\rangle_{mn}\langle 1| + |1\rangle_{mn}\langle 0|,$ $\hat{Z}_m = |0\rangle_{mn}\langle 0| - |1\rangle_{mn}\langle 1|.$ 4. The method of claim 1 wherein the entangled W-states are represented by:

$$|W_0\rangle = \frac{1}{\sqrt{3}}(e^{i\phi_1}|100\rangle + e^{i\phi_2}|010\rangle + e^{i\phi_3}|001\rangle), \text{ and}$$

$$|W_1\rangle = \frac{1}{\sqrt{3}}(e^{i\theta_1}|110\rangle + e^{i\theta_2}|101\rangle + e^{i\theta_3}|011\rangle)$$

where the phase angles $\phi_1$, $\phi_2$, $\phi_3$, $\theta_1$, $\theta_2$, and $\theta_3$ are integer multiples of $\pi$, $|0\rangle$ and $|1\rangle$ represent qubit-basis states.

5. The method of claim 1 wherein preparing the three qubits in one or two entangled W-states further comprises transmitting the three qubits through one of:

a series of quantum gates; and a probabilistic entangler.

6. The method of claim 1 wherein storing the three qubits further comprises storing each qubit in one of:
- an optical fiber loop;
- optical switch; and
- a nuclear spin state of an atomic system.

7. The method of claim 1 wherein storing the second qubit and third cubit further comprises transmitting the second qubit to the second party and the third qubit to the third party.

8. The method of claim 1 wherein transmitting each qubit further comprises using optical fibers.

9. The method of claim 1 revealing the bit to the second party may include disentangling the three qubits in the entangled W-state to reproduce the three qubits in one of the product states:
- $|000\rangle$, and
- $|111\rangle$ where $|0\rangle$ and $|1\rangle$ represent qubit-basis states.

10. The method of claim 9 wherein disentangling the three qubits in the entangled W-state further comprises transmitting the three qubits through a series of quantum gates.

11. A method for executing a commitment phase of a bit-commitment protocol, the method comprising:
- preparing three qubits in one of two entangled W-states, two of the three qubits are in a first qubit-basis state and one of the three qubits is in a second qubit-basis state, wherein the first and second qubit-basis state are orthogonal polarization states of electromagnetic waves or two atomic nuclear spin states;
- storing the first qubit in a first storage device controlled by a first party; and
- transmitting the second qubit to a second party and the third qubit to a third party.

12. The method of claim 11 wherein preparing the three qubits further comprising preparing the three qubits in one of the following two product states:
- $|000\rangle$, and
- $|111\rangle$ where $|0\rangle$ and $|1\rangle$ represent qubit-basis states.

13. The method of claim 11 wherein preparing three qubits in one of two entangled W-states further comprises performing an operation on the three qubits, which can be mathematically represented by:

$$\hat{W} = \frac{1}{\sqrt{3}} (\hat{X}_1 \hat{Z}_2 + \hat{X}_2 \hat{Z}_3 + \hat{Z}_1 \hat{X}_3)$$

where $$\hat{X}_m = |0\rangle_{mn}\langle 1| + |1\rangle_{mn}\langle 0|,$$

$$\hat{Z}_m = |0\rangle_{mn}\langle 0| - |1\rangle_{mn}\langle 1|.$$

14. The method of claim 11 wherein the entangled W-states are represented by:

$$|W_0\rangle = \frac{1}{\sqrt{3}} (e^{i\phi_1}|100\rangle + e^{i\phi_2}|010\rangle + e^{i\phi_3}|001\rangle), \text{ and}$$

$$|W_1\rangle = \frac{1}{\sqrt{3}} (e^{i\theta_1}|110\rangle + e^{i\theta_2}|101\rangle + e^{i\theta_3}|011\rangle)$$

where the phase angles $\phi_1, \phi_2, \phi_3, \theta_1, \theta_2,$ and $\theta_3$ are integer multiples of $\pi$, $|0\rangle$ and $|1\rangle$ represent qubit-basis states.

15. The method of claim 11 wherein preparing the three qubits in one or two entangled W-states further comprises transmitting the three qubits through one of:
- a series of quantum gates; and
- a probabilistic entangler.

16. The method of claim 11 wherein storing the three qubits further comprises storing each qubit in one of:
- an optical fiber loop;
- optical switch; and
- a nuclear spin state of an atomic system.

17. A method for executing a reveal phase of a bit-commitment protocol for transmitted a bit from a first party to a second party, the method comprising:
- transmitting a first qubit from the first party to the second party;
- storing a second qubit in a storage device controlled by the second party;
- transmitting a third qubit from a third party to the second party, wherein
- the three qubits are in one two orthogonal polarization states of electromagnetic waves or two atomic nuclear spin states and prepared in either a first entangled W-state or a second entangled W-state, the first W-state represents one bit value and the second W-state represents a second bit value; and
- revealing the bit to the second party by detecting the states of the three qubits to determine whether the three qubits are entangled in the first W-state or entangled in the second W-state.

18. The method of claim 17 wherein first W-state and the second W-state further comprises:

$$|W_0\rangle = \frac{1}{\sqrt{3}} (e^{i\phi_1}|100\rangle + e^{i\phi_2}|010\rangle + e^{i\phi_3}|001\rangle), \text{ and}$$

$$|W_1\rangle = \frac{1}{\sqrt{3}} (e^{i\theta_1}|110\rangle + e^{i\theta_2}|101\rangle + e^{i\theta_3}|011\rangle)$$

respectively, where the phase angles $\phi_1, \phi_2, \phi_3, \theta_1, \theta_2,$ and $\theta_3$ are integer multiples of $|0\rangle$ and $|1\rangle$ represent qubit-basis states.

19. The method of claim 17 wherein the storage device further comprises one of:
- an optical fiber loop;
- optical switch; and
- a nuclear spin state of an atomic system.

20. The method of claim 17 wherein the transmitted qubits are transmitted over optical fibers.

21. The method of claim 17 revealing the bit to the second party may include disentangling the three qubits in the entangled W-state to reproduce the three qubits in one of the product states:
- $|000\rangle$, and
- $|111\rangle$ where $|0\rangle$ and $|1\rangle$ represent qubit-basis states.

22. The method of claim 17 wherein disentangling the three qubits in the entangled W-state further comprises transmitting the three qubits through a series of quantum gates.

23. A system for executing a commitment phase of a bit-commitment protocol for transmitting a bit from a first party to a second party, the system comprising:
- a product state generator configured to generate a three qubit product state representing the bit, the product state comprising a first qubit, a second qubit, and a third qubit, each qubit in the same qubit-basis state, wherein the qubit-basis state is one of two orthogonal polarization states of electromagnetic waves or one of two atomic nuclear spin states; and
an entangler configured to entangling the three qubits into either a first W-state or a second W-state.

24. The system of claim 23 wherein the system further comprises a first storage device configured to store the first qubit controlled by the first party.

25. The system of claim 24 wherein the storage devices further comprise one of:
fiber loop;
an optical switch; and
a nuclear spin state of an atomic system.

26. The system of claim 23 further comprising a number of optical fibers configured to transmit each of the three qubits.

27. The system of claim 23 wherein the product state generator generates the three qubits in one of the two states represented by:
$|000\rangle$, and
$|111\rangle$
where $|0\rangle$ and $|1\rangle$ represent qubit-basis states.

28. The system of claim 23 wherein the entangler further comprises a number of quantum gates configured to transform a first product state generated by the product state generator into a W-state represented by:

$$|W_0\rangle = \frac{1}{\sqrt{3}}(e^{i\phi_1}|100\rangle + e^{i\phi_2}|010\rangle + e^{i\phi_3}|001\rangle),$$

and transform a second product state generated by the product state generator into a W-state represented by:

$$|W_1\rangle = \frac{1}{\sqrt{3}}(e^{i\theta_1}|110\rangle + e^{i\theta_2}|101\rangle + e^{i\theta_3}|011\rangle),$$

where the phase angles $\phi_1$, $\phi_2$, $\phi_3$, $\theta_1$, $\theta_2$, and $\theta_3$ are integer multiples of $\pi$, $|0\rangle$ and $|1\rangle$ represent vertically and horizontally polarized photons, respectively; or $|0\rangle$ and $|1\rangle$ represent horizontally and vertically polarized photons, respectively.

29. A system for executing a reveal phase of a bit-commitment protocol for revealing a bit transmitted from a first party to a second party, the system comprising:
a storage device controlled by the second party and configured to store a first qubit of three qubits, the three qubits are in one of two orthogonal polarization states of electromagnetic waves or in one of two atomic nuclear spin states and are entangled in either a first W-state or a second W-state, wherein the first W-state represents one bit value, the second W-state represents a second bit value, the first qubit is transmitted from the first party to the second party, and a third qubit of the three qubits is transmitted from a third party to the second party; and
a state projection device configured to receive the three qubits and detect the three qubits in either the first W-state or the second W-state.

30. The system of claim 29 wherein the storage devices further comprise one of:
fiber loop;
an optical switch; and
a nuclear spin state of an atomic system.

31. The system of claim 29 wherein the state projection device may further comprise a disentangler configured to disentangle the three qubits entangled in the W-state to produce the three qubits in the product state representing the bit.

32. The system of claim 29 wherein the disentangler further comprises a number of quantum gates configured to transform a W-state given by:

$$|W_0\rangle = \frac{1}{\sqrt{3}}(e^{i\phi_1}|100\rangle + e^{i\phi_2}|010\rangle + e^{i\phi_3}|001\rangle)$$

into a product state $|000\rangle$ and transform a W-state given by:

$$|W_1\rangle = \frac{1}{\sqrt{3}}(e^{i\theta_1}|110\rangle + e^{i\theta_2}|101\rangle + e^{i\theta_3}|011\rangle)$$

into a product state $|111\rangle$, where the phase angles $\phi_1$, $\phi_2$, $\phi_3$, $\theta_1$, $\theta_2$, and $\theta_3$ are integer multiples of $\pi$, $|0\rangle$ and $|1\rangle$ represent vertically and horizontally polarized photons, respectively; or $|0\rangle$ and $|1\rangle$ represent horizontally and vertically polarized photons, respectively.

33. The system of claim 29 wherein the state projection device further comprises a polarizing beamsplitter configured to transmit a first polarization state of polarized photon to a first photodetector and a second polarization state of a polarized photon to a second photodetector.

* * * * *

UNITED STATES PATENT AND TRADEMARK OFFICE
CERTIFICATE OF CORRECTION

PATENT NO.         : 7,769,173 B2
APPLICATION NO.    : 11/590493
DATED              : August 3, 2010
INVENTOR(S)        : William John Munro et al.

Page 1 of 1

It is certified that error appears in the above-identified patent and that said Letters Patent is hereby corrected as shown below:

In column 36, line 20, in Claim 17, after "one" insert -- of --.

In column 36, line 41, in Claim 18, after "of" insert -- $\pi$, --.

Signed and Sealed this
Third Day of May, 2011

David J. Kappos
*Director of the United States Patent and Trademark Office*